(12) United States Patent
Smolek

(10) Patent No.: US 12,512,016 B2
(45) Date of Patent: Dec. 30, 2025

(54) SURROGATE HUMAN EYE MODEL

(71) Applicant: The Government of the United States, as Represented by the Secretary of the Army, Fort Detrick, MD (US)

(72) Inventor: Michael K. Smolek, Pearl River, LA (US)

(73) Assignee: The Government of the United States, as represented by the Secretary of the Army, Ft. Detrick, MD (US)

( * ) Notice: Subject to any disclaimer, the term of this patent is extended or adjusted under 35 U.S.C. 154(b) by 914 days.

(21) Appl. No.: 17/767,863

(22) PCT Filed: Nov. 18, 2019

(86) PCT No.: PCT/US2019/061973
§ 371 (c)(1),
(2) Date: Apr. 11, 2022

(87) PCT Pub. No.: WO2021/076160
PCT Pub. Date: Apr. 22, 2021

(65) Prior Publication Data
US 2024/0087475 A1    Mar. 14, 2024

Related U.S. Application Data

(60) Provisional application No. 62/925,995, filed on Oct. 25, 2019, provisional application No. 62/923,066, filed on Oct. 18, 2019.

(51) Int. Cl.
*G09B 23/30*    (2006.01)

(52) U.S. Cl.
CPC .................................. *G09B 23/30* (2013.01)

(58) Field of Classification Search
None
See application file for complete search history.

(56) References Cited

U.S. PATENT DOCUMENTS

| | | |
|---|---|---|
| 2009/0004637 A1 | 1/2009 | Carda et al. |
| 2015/0279239 A1 | 10/2015 | Chang et al. |
| | (Continued) | |

FOREIGN PATENT DOCUMENTS

| | | |
|---|---|---|
| WO | 2018/09031 A1 | 5/2018 |

OTHER PUBLICATIONS

European Patent Office, extended European search report for EP App. No. 19949457.6, Sep. 6, 2023, pp. 1-6.
(Continued)

*Primary Examiner* — James B Hull
(74) *Attorney, Agent, or Firm* — Leigh Z. Callander

(57) ABSTRACT

A surrogate human model eye, comprising: (a) a gelatin core; (b) a sclera; (c) an anterior chamber; (d) a posterior chamber; (e) a cornea; (f) an optic nerve and (g) an outer shell structure based on a hydrogel matrix, wherein said surrogate human model eye is made from a silicone-based master mold and dimensioned for replacement of postmortem ocular tissue and practice in blast research and testing. Methods are provided for practicing blast research and testing on a surrogate human eye model comprising: supplying a surrogate human eye model comprising: (a) a gelatin core; (b) a sclera; (c) an anterior chamber; (d) a posterior chamber; (e) a cornea; (f) an optic nerve and (g) an outer shell structure based on a hydrogel matrix, wherein said surrogate human model eye is made from a silicone-based master mold and dimensioned for replacement of postmortem ocular tissue.

16 Claims, 23 Drawing Sheets

(56) References Cited

U.S. PATENT DOCUMENTS

| | | |
|---|---|---|
| 2016/0086517 A1 | 3/2016 | Gao et al. |
| 2017/0229043 A1 | 8/2017 | Huh et al. |
| 2019/0325786 A1* | 10/2019 | Stanko .................... A61B 8/10 |
| 2019/0362654 A1 | 11/2019 | Omata et al. |

OTHER PUBLICATIONS

International Search Report for Application No. PCT/US2019/061973, mailed Jan. 29, 2020 (3 pages).

* cited by examiner

FIG. 5

SURROGATE HUMAN EYE MODEL

CROSS-REFERENCE TO RELATED APPLICATIONS

This patent application is a national phase of International Patent Application No. PCT/US2019/061973, filed Nov. 18, 2019, which claims priority to U.S. Provisional Patent Application No. 62/923,066, filed Oct. 18, 2019, and to U.S. Provisional Application No. 62/925,995, filed Oct. 25, 2019, the contents of each of which are incorporated herein by reference in their entirety.

STATEMENT AS TO RIGHTS OR INVENTIONS MADE UNDER FEDERALLY SPONSORED RESEARCH AND DEVELOPMENT

The invention was made with government support from the Aeromedical Research Laboratory, a subordinate organization of the United States Army Medical Research and Materiel Command. The United States Government has certain rights in the invention.

BACKGROUND

Medical professionals specializing in diagnosing and treating injuries to, and diseases of, the eye must practice certain surgical techniques on various models of the human eye prior to actually operating on human patients. Prior art training methods often use animal eyes, such as, for example human cadaver eyes or animal eyes. The use of human cadaver and/or animal eyes is burdened with many procedural issues. These eye models must be refrigerated before use. Even when refrigerated, these eye models suffer from a short "shelf life" due to inevitable biological decomposition. The handling of such biological eyes requires compliance with regulations, including but not limited to, the Bloodborne Pathogens Standard promulgated under the federal Occupational Health and Safety Act. After use, the eye models must be properly disposed. Furthermore, acquisition of post-mortem human or animal eyes in a timely manner is often difficult due to a limited supply of acceptable specimens. In addition to the inherent variability among species, there may also be considerable hydration and decomposition variability due to how the samples were handled and stored.

A model human eye that closely mimics the anatomy and physiology of the human eye, but which does not require special handling procedures is necessary. A surrogate human eye model eliminates many of the variability concerns encountered with post-mortem tissue. Applicant devised an experimental approach toward mass producing an anatomically and biomechanically accurate model of the human eye using predominantly hydrogel-based materials to replicate the tissue material properties of the living eye. Applicant's surrogate human eye model is preferably fluid-filled in a manner similar to the living eye. Properties of the fluid can be modified in terms of viscosity and intraocular pressure (IOP). The corneo-scleral shell of the surrogate human eye model remains tough and resilient to an applied force. In addition, the surrogate human eye model should have an attached simulated optic nerve to improve understanding of how the nerve might be compressed or dislocated by the force of a blunt impact or a shock wave event passing through or reflected by the bony ocular orbit of the skull. Applicant's invention is intended to largely replace or supplement human donor eyes or animal eyes used for destructive testing, particularly for repeatability testing to evaluate protective eyewear performance based on quantifiable stress and strain parameters of the eye and surrounding soft tissues in the orbit.

For example, primary blast injury (PBI) occurs when a supersonic shock wave (i.e., overpressure) interacts destructively with the tissues of the body, resulting in one or more forms of physical trauma. It is assumed that overpressure induces compression or shearing stresses that cause the strain limit of the impacted tissue to be exceeded. Because different tissues can have different strain limits, and the pattern of overpressure can vary with blast parameters, controlled experiments of PBI have been inherently difficult to perform. Primary blast injury (PBI) may include trauma to the lungs, traumatic brain injury (TBI), complete or partial loss of hearing, and/or a complete or partial loss of vision.

While trauma from a shrapnel impact is often obvious, PBI is likely to be an occult trauma that is undiagnosed at the time of the blast event. A confirmed diagnosis of PBI may come weeks or months after the initial trauma, and in some cases, a diagnosis of PBI might not be confirmed unless an autopsy is conducted. Often PBI becomes manifest through clinical testing only after unexplained sensory deficits or behavioral changes related to neurological dysfunction are reported by the victim or family members. Ocular FBI, for example, may be suspected when a blast victim notices a chronic change in optical clarity, color vision, double vision, or areas of lost vision in one or both eyes. According to a review of the Joint Theater Trauma Registry (JTTR) for data recorded between 2002 to 2011, explosive blasts caused 92 percent (%) of ocular injuries sustained in combat, with approximately half of the injuries attributed to FBI. While ocular FBI has received less attention than TBI, a growing body of scientific and clinical evidence confirms that shock waves propagating within the eye and ocular orbit can cause overpressure-induced injuries, affecting one or more physiological or neurological functions resulting in vision loss.

Translating ocular FBI data that have been acquired from experimental animal models into a predictable visual loss in humans is challenging because the predominant models, namely rodents and pigs, have eyes and skulls that are morphologically dissimilar to humans. Therefore, any evidence of overpressure-induced trauma obtained with animal models may poorly correlate to trauma in the human eye for the same shock wave parameters. Likewise, predicting the relative severity of overpressure trauma is problematic because of physical scaling differences when comparing the anatomy of humans and small laboratory animals. Furthermore, animal models cannot be used to test and evaluate the efficacy of protective eyewear made to fit the human head. Although non-human primates are more anatomically similar to humans, they have not been widely used as an ocular FBI model, most likely due to the cost involved. For now, ocular FBI predictions based on computer modeling has been of limited benefit because of the inability to validate these models experimentally. However, the acquisition of more accurate and precise empirically acquired data could substantially improve the reliability of computer simulations of ocular FBI.

Finally, overpressure data obtained from electronically instrumented headforms have little direct relevance in understanding the relationship between ocular FBI and intraorbital shock wave propagation due to a lack of anatomical correlation of bone structure between a human skull and currently manufactured headforms. A morphologically accurate physical eye model for obtaining direct measurements of blast overpressure propagation and evaluating injury biomarkers from within the eye and orbit is needed to further advance this field of research.

Applicant's surrogate human eye model would help to bridge several current research gaps. This bioengineered model has the potential to reduce the cost and regulatory oversight associated with using animals exclusively for research, and it would be useful to validate the results of computer models of blast dynamics. It would also be beneficial for evaluating the blast-resistance of existing or new types of protective eyewear. Additionally, this model contains a simulated cornea that may also have relevance for other purposes, such as modeling topographical changes in the pre- and post-blast shape of the anterior segment portion of the model.

SUMMARY

It has been discovered that it is possible to generate a surrogate human eye model that is standardized, storable, and an economical replacement for current post-mortem ocular tissue for use in blast research and testing. In some embodiments, Applicant's surrogate human eye model may be applied for use in biomedical testing, training, and tissue replacement or wound repair. Such a surrogate human eye model minimizes regulatory oversight reporting, as well as reduces the overall cost of biosafety requirements associated with potentially infectious post-mortem eyes. Virtually identical surrogate human eye models can be rapidly produced. A standardized design also reduces the need for large sample sizes by lowering variance, which may also improve the repeatability of study results.

Embodiments include a surrogate human model eye, comprising: (a) a gelatin core having a sclera, an anterior chamber, a posterior chamber, a cornea and an optic nerve attached to the gelatin core and (b) an outer shell structure wherein the surrogate human model eye is made from a silicone-based master mold and dimensioned for replacement of post-mortem ocular tissue. The surrogate human eye model may further comprise a hydrogel coating deposited onto the gelatin core. The hydrogel coating is made from alginate and can be further hybridized by addition of molecules that increase strength and resilience. These molecules may be selected from the group consisting of: collagen, long-chain polysaccharide molecules, and ultraviolet light sensitive crosslinking molecules and activators.

An embodiment may include a surrogate human eye model comprising a pressure sealable port at a distal end of the optic nerve. A slender, flexible tubing may be introduced through the sealable port. The surrogate human eye model may further comprise a crystalline lens. The crystalline lens is constructed from gelatin and alginate-based hydrogel in certain embodiments.

In other embodiments, a surrogate human eye model is used with an eye-mounting system that simulates soft tissue of an ocular orbit. Further uses include tissue engineering scaffold for culturing epithelial cells, endothelial cells, astrocyte cells, fibroblast/keratocyte cells, collagen growth, artificial tissue generation, ocular shock wave testing, ocular blunt impact testing, ocular incisional trauma testing, directed energy testing, protective spectacle testing, protective goggle testing, ocular surgical procedure simulation, ocular clinical procedure simulation, ocular laboratory procedure simulation, as a physiological model for testing biological or chemical product safety, testing cosmetic product safety, testing radiation-based product safety, and for use as a simulated eye for theatrical, film, television, and video productions.

Embodiments may include a surrogate human eye model that is casted in a two-step process: (i) casting an internal shape of the eye model, and (ii) forming an exterior shape as an outer shell structure. The thickness of the outer shell structure is adjusted by changes selected from the group consisting of: temperature change, concentration change, change in formulation of materials, and change in processing time.

Provided are methods of practicing blast research and testing on a surrogate human eye model by supplying a surrogate human eye model comprising: a) a gelatin core having a sclera, an anterior chamber, a posterior chamber, a cornea and an optic nerve attached to the gelatin core and (b) an outer shell structure wherein said surrogate human model eye is made from a silicone-based master mold and dimensioned for replacement of post-mortem ocular tissue. The surrogate human eye model may further comprise a hydrogel coating deposited onto the gelatin core. The hydrogel coating is made from alginate and can be further hybridized by addition of molecules that increase strength and resilience. These molecules may be selected from the group consisting of: collagen, long-chain polysaccharide molecules, and ultraviolet light sensitive crosslinking molecules and activators. Hybridization may also include the addition of living cells for the expression of chemical mediators resulting from interactions with the eye model, such as intentionally wounding the model to elicit the expression of inflammatory chemical mediators, or administering therapeutic products that induce healing to injuries induced in the model. Additionally, the surrogate human eye model may be subjected to laboratory histological analysis techniques in a manner similar to that applied to living or postmortem ocular tissue to collect and analyze pathology specimens.

BRIEF DESCRIPTION OF THE DRAWINGS

The following drawings form part of the present specification and are included to further demonstrate certain embodiments of the present invention. The invention may be better understood by reference to one or more of these drawings in combination with the detailed description of specific embodiments presented herein.

FIG. 5 is a schematic representing the shape of the eye material cornea as seen with Pentacam® HR tomographic scanning.

FIG. 13 is a view of the eye model inserted into eye holder. FIG. 14 is a view of the port connection from inside the cranium. FIG. 15 is a view of dual eye mounting into the skull headform. Fiber-optic pressure sensors may be positioned at key locations within the eye or optic nerve model via a catheter in FIG. 16.

FIG. 17A illustrates a representative two-part silicone master mold. FIG. 17B illustrates a representative three-part silicone master mold.

FIG. 19A is a photograph of a completed scaffold immersed in alginate solution. FIG. 19B is a ZEISS optical coherence tomography (OCT) view of hydrogel shell in cross-section. FIG. 19C is a Pentacam® HR display of the cornea portion of the model.

Figures 1A, 1B, 1C, 1D, 1E:
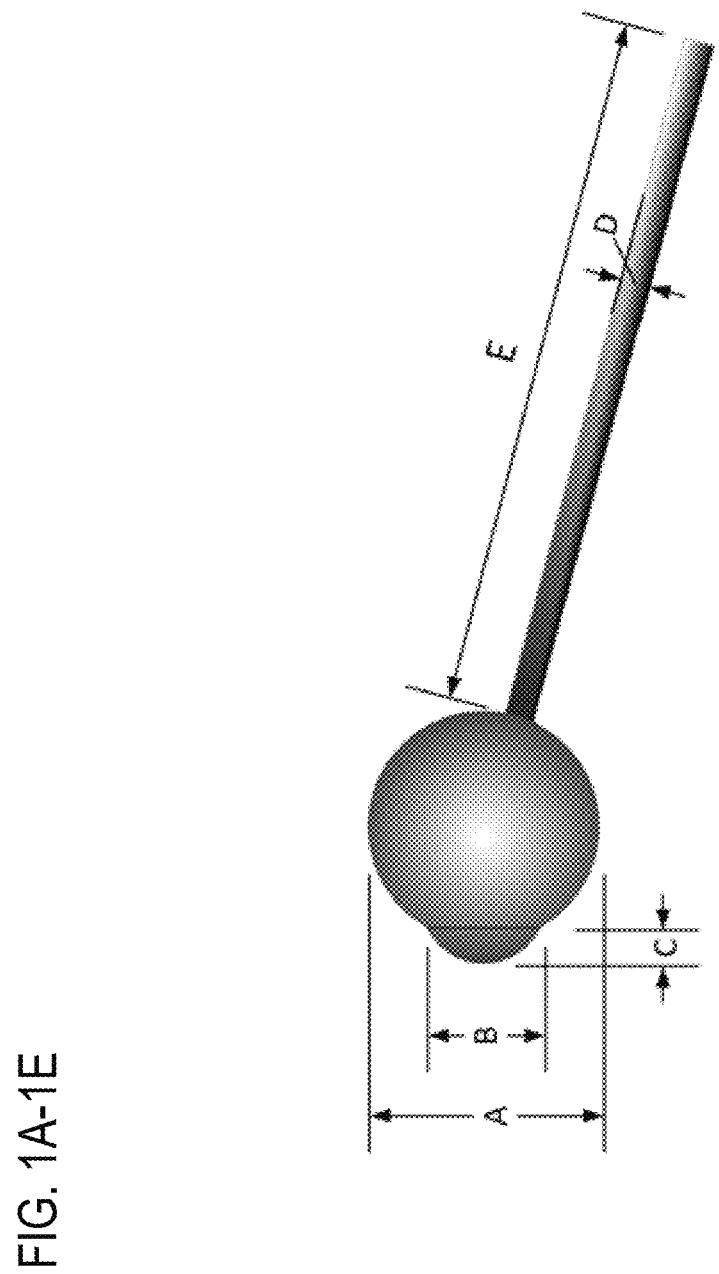
FIG. 1A-1M represents an illustration of a silicone-based master mold. In A, the diameter of the spherical globe section for establishing the sclera is shown. The corneoscleral chord diameter for establishing the cornea section is shown in B. In C, the sagittal height of the corneal section is illustrated. The diameter of the section used to cast the optic nerve is shown in D. Finally, in E, the length of the optic nerve section is illustrated. In F, anterior and posterior chambers of the eye plus an attached optic nerve are represented. A hydrogel coating is illustrated in G. In H, a pressure sealable port is represented at the distal end of the simulated optic nerve. Tubing or other slender, flexible objects represented in I can be introduced through the port. For example, fiber optic-based pressure transducers in J can be used. Finally, in some embodiments the surrogate eye model includes a synthetic representation in K a crystalline lens. The anterior chamber is represented in L, while a posterior chamber is represented in M.

In the Summary above, in the Detailed Description below, and the claims below, as well as the accompanying figures, reference is made to particular features of the invention. It is to be understood that the disclosure of the invention in this specification includes all possible combinations of such particular features. For example, where a particular feature is disclosed in the context of a particular embodiment or embodiment of the invention, or a particular claim, that feature can also be used, to the extent possible, in combination with and/or in the context of other particular embodiments and embodiments of the invention, and in the invention generally. For the purposes of explanation, numerous specific details are set forth in order to provide a thorough understanding of the present invention. It will be apparent, however, to one skilled in the art that the present invention may be practiced without these specific details.

DETAILED DESCRIPTION

It has been discovered that a surrogate human model eye may comprise (a) a gelatin core having a sclera, an anterior chamber, a posterior chamber, a cornea and an optic nerve attached to the gelatin core and (b) an outer shell structure wherein the surrogate human model eye is made from a silicone-based master mold and dimensioned for replacement of post-mortem ocular tissue. The surrogate human eye model may further comprise a hydrogel coating deposited onto the gelatin core. The hydrogel coating is made from alginate and can be further hybridized by addition of molecules that increase strength and resilience. These molecules may be selected from the group consisting of: collagen, long-chain polysaccharide molecules, and ultraviolet light sensitive crosslinking molecules and activators.

Known Problems in Other Human Eye Models

Current simulated eye models are crude and lack dimensionally accurate structure or shape that represents the living eye. These models are hollow balls or balloons made entirely of synthetic materials (plastic, vinyl, rubber, etc.) that cannot be refined or adjusted to replicate the biomechanical responses of living tissue. For example, living tissue has a certain degree of viscoelasticity due to the fact that the tissue is hydrated with water, and that water typically undergoes some amount of time-dependent displacement whenever an external force is applied to the tissue. Thus, the movement of water is a critical characteristic needed to accurately simulate the biomechanical behavior of living tissue. The invented eye model is comprised of hydrogel materials that retain water, and thus have the ability to replicate biomechanical responses more accurately than a fully synthetic material that may have elastic properties, but lacks the ability to simulate viscoelasticity.

Other currently used models for research are the post-mortem cadaver eye or ex vivo enucleated eye from a human donor or the eyes of animals obtained from an animal processing facility. There are inherent issues and potential drawbacks to using postmortem tissue for research. First there can be a statistically significant increase in biological variability from sample to sample due to age differences or species-specific morphological differences. Second, there can be statistically significant variability in quality due to a degraded state of the tissue at the time of collection; namely, any significant post-mortem delay in collecting the eye may cause dehydration and tissue decomposition, particularly if temperature and humidity are uncontrolled.

Applicant's surrogate eye model avoids the problem of using post-mortem tissue of poor or unknown quality in research, and assures a constant supply of a reliable research product of high quality. Applicant's invention provides benefit for conducting repeatability studies in which a low statistical variance is needed for proper scientific control, or for use in multiple laboratories whenever there is a need to compare results or pool data together from multiple study sites.

Surrogate Human Eye Model Master Molds and Methods of Making Them

Applicant's invention delivers a dimensionally-accurate and precise physical surrogate human eye model constructed by a specific two-step process using materials predominantly of a biological origin. The technique involves mass production of a dimensionally accurate human eye model through a molding and coating process. The human eye model acts as a surrogate for a post-mortem living eye under certain scenarios. These scenarios include, but are not limited to, biomechanical testing and experimental research of tissue strength, intraocular pressures, and effects of externally applied force on corneo-scleral form and function. These applied forces arrive in the form of blunt or incisional impacts by objects foreign to the eye, or via passage through ocular tissue by shock waves created from explosive devices. More specifically, Applicant's invention proves useful for evaluating efficacy of protective armor or other devices intended to reduce or eliminate the potential for ocular trauma due to accidental injury or the intentional use of weapons. Embodiments may include a surrogate human eye model that is casted in a two-step process: (i) casting an internal shape of the eye model, and (ii) forming an exterior shape as an outer shell structure. The thickness of the outer shell structure is adjusted by changes selected from the group consisting of: temperature change, concentration change, change in formulation of materials, and change in processing time. The formation of the exterior shape as a shell structure that is dependent upon the internal shape of the eye model. The internal casting of the eye model is such that it can be performed in multiple steps so that a simulated representation of the iris, crystalline lens, lens capsule, zonular fibers, and ciliary body can be embedded into the eye model prior to the creation of the outer shell.

Two-part silicone molds can be used to make the surrogate human model eyes including the corneoscleral shell and attached optic nerve without the option of having additional internal ocular anatomy modeled. The two-part mold uses a single injection of liquid gelatin to produce the inner core of the eye model. Three-part silicone molds can be used to allow additional internal components in the eye model, optionally a simulated iris and/or simulated lens, such as a crystalline lens, with a supporting structure. The three-part mold design permits multiple injection events that build the internal components of the eye model in layers between the anterior and posterior chambers. The three-part molds can contain two sections of embedding clay, one for producing one-half of the posterior section of the globe and attached optic nerve, similar to the two-part mold-making process, and one for the complete anterior segment portion of the globe. The two posterior mold sections can be poured individually in two separate steps in a manner similar to the two-part mold, followed by pouring of the anterior section of the mold as the third and final step of the master mold-making process.

Embodiments include a surrogate human model eye, comprising: (a) a gelatin core having a sclera, an anterior chamber, a posterior chamber, a cornea and an optic nerve attached to the gelatin core and (b) an outer shell structure wherein the surrogate human model eye is made from a silicone-based master mold and dimensioned for replacement of post-mortem ocular tissue. The surrogate human eye model may further comprise a hydrogel coating deposited onto the gelatin core. The hydrogel coating is made from alginate and can be further hybridized by addition of molecules that increase strength and resilience. These molecules may be selected from the group consisting of: collagen, long-chain polysaccharide molecules, and ultraviolet light sensitive crosslinking molecules and activators.

Applicant's invention allows for a surrogate human eye model that can be mass-produced and standardized for use and modified in multiple ways depending upon research needs. The surrogate human eye model comprises an anterior chamber that can be placed into a liquid state simulating aqueous humor through localized heating of the cornea, leaving a gelled posterior chamber similar to the vitreous humor of a young living eye. Likewise, the entire surrogate human eye model can be placed into a warm bath to liquefy the internal contents, drained by excising the end of the optic nerve, and then re-inflated with a substitute liquid with a known viscosity. The internal pressure of the surrogate human eye model may be adjusted from 8 to 44 mm Hg via surgical tubing cannulation through the optic nerve, as measured by a Reichert Tono-Pen® or by a Reichert ORA® ocular response analyzer air-puff tonometer (Reichert, Inc., Depew, NY) that also evaluated corneal hysteresis (CH) and the corneal resistance factor (CRF) of the model. Currently, the CH and CRF values are predictable via linear regression, but have lower values than the living cornea due to the excessive elasticity of the alginate hydrogel. In addition, both strip extensiometry and globe inflation methods have been used to manually characterize the elasticity modulus of the hydrogel via stress-strain functions. Strengthened hydrogel materials that include the addition of collagen fibers added to the alginate and subsequently crosslinked with UV light are now being explored. In particular, synthetic matrixes that incorporate polyvinyl alcohol (PVA) with sodium alginate in proportions desired for achieving specific strengths are being studied. Polyvinyl alcohol (PVA) can be crosslinked with freeze-thaw methods or ultraviolet (UV) light once the alginate scaffold forms by ionic cross-linking with calcium. Other variants of hybrid hydrogels are open to experimentation with this eye model, including the inclusion of collagen, methyl acrylate, or glutaraldehyde as UV-crosslinkable materials. Separating the process of defining the eye model's shape using ionically crosslinked sodium alginate from the process of strengthening the model with PVA or another material that depends on photo-activated or mechanical crosslinking appears to be optimal for maintaining optimum control over the quality of the final product. In addition, catheterization via the simulated optic nerve pathway is possible, permitting Fabry-Pérot fiber optic pressure transducers (FISO, Quebec, Canada) to be used to evaluate pressure at discrete locations within the eye.

An embodiment may include a surrogate human eye model comprising a pressure sealable port at a distal end of the optic nerve. A slender, flexible tubing may be introduced through the sealable port. The surrogate human eye model may further comprise a crystalline lens. The crystalline lens is constructed from gelatin and alginate-based hydrogel in certain embodiments.

In other embodiments, a surrogate human eye model is used with an eye-mounting system that simulates soft tissue of an ocular orbit. Further uses include tissue engineering scaffold for culturing epithelial cells, endothelial cells, astrocyte cells, fibroblast/keratocyte cells, collagen growth, artificial tissue generation, ocular shock wave testing, ocular blunt impact testing, ocular incisional trauma testing, directed energy testing, protective spectacle testing, protective goggle testing, ocular surgical procedure simulation, ocular clinical procedure simulation, ocular laboratory procedure simulation, as a physiological model for testing biological or chemical product safety, testing cosmetic product safety, testing radiation-based product safety, and for use as a simulated eye for theatrical, film, television, and video productions.

A surrogate human eye model has many characteristics that mimic the living human eye. Applicant's invention is an acceptable standard for conducting highly repeatable blast and impact tests with various protocols and across different laboratories. Methods of practicing blast research and testing on a surrogate human eye model are provided by supplying a surrogate human eye model comprising: a) a gelatin core having a sclera, an anterior chamber, a posterior chamber, a cornea and an optic nerve attached to the gelatin core and (b) an outer shell structure wherein said surrogate human model eye is made from a silicone-based master mold and dimensioned for replacement of postmortem ocular tissue. The gelatin core can be made from any type of gelatin, such as type A or type B gelatin. In some embodiments, the gelatin core is made from type A gelatin, such as, for example, type A porcine gelatin. The surrogate human eye model may further comprise a hydrogel coating deposited onto the gelatin core. The hydrogel coating is made from alginate and can be further hybridized by addition of molecules that increase strength and resilience. These molecules may be selected from the group consisting of: collagen, long-chain polysaccharide molecules, and ultraviolet light sensitive crosslinking molecules and activators. Applicant's surrogate eye model has the primary advantage over current eye models of being made of a material that supports other living cellular or biological materials. It therefore can be used not only as a passive destructive test sample for assessing the effects of mechanically-induced trauma, but it also has the potential to evaluate chemical, radiative, or biological products for ocular safety in the presence of cell cultures grown on or within the eye model.

In addition, the eye model has an advantage over current model by being capable of acting as a tension-stressed scaffold for tissue engineering purposes, including the growing of artificial corneas or other body parts. Embodiments include serving as a tension-stressed scaffold for growing living artificial corneas in tissue culture, or serving as a pressurized surrogate eye for teaching ophthalmic surgical procedures. Applicant's surrogate eye model can also be used for other purposes including, but not limited to the production of living tissue replacements that utilize tissue culturing of living cells or the growth of viable tissues deposited by living cells, as well as applications for the teaching or testing of clinical or laboratory methods, or surgical procedures involving the eye.

Applicant's surrogate eye model also has an advantage over some current eye models of being a mass-produced product that can be made to order or stored for future use when large quantities of the eye model are needed.

Applicant's surrogate eye model also has the advantage of having an attached simulated optic nerve that is an ideal route for cannulization or catheterization of the eye for the purpose of embedding instrumentation or controlling internal pressure. Unlike other current eye models, the invented eye model does not need to be invasively entered through a surgical incision or puncture that could otherwise compromise the structural stability of the globe, or interfere with the recording of experimental data from the eye model.

It is contemplated that in certain embodiments, the thickness of the outer shell can be adjusted by altering the temperature, concentration, or formulation of the materials used, or by altering the processing time. A surrogate eye model with a gelatin core that can be retained, removed, or replaced after the outer shell is constructed. The surrogate eye model comprises an outer shell of alginate-based hydrogel material that retains water and therefore has viscoelastic properties subject to water displacement within the hydrogel material. Therefore, it is possible that Applicant's surrogate eye model has an outer shell of alginate-based hydrogel material that is compatible with the growth and/or natural movement of living cells, long-chain polysaccharide molecules, and fibrous tissue such as collagen. The outer shell of alginate-based hydrogel material is compatible with other types of biological or biosynthetic materials for the purpose of adjusting the material properties of the outer shell.

Complexity in shape and precise dimensions that produce an accurate representation of the shape and dimensions of the living eye's sclera, cornea, and optic nerve are preferred.

Applicant discovered a surrogate eye model that offers an attached flexible simulated optic nerve that permits the study of optic nerve damage due to externally applied force to the eye or within the bony orbit surrounding the eye. Therefore, it is possible to evaluate anatomical and biomechanical responses to ocular trauma with or without protective eyewear. The simulated optic nerve is constructed is in the eye surrogate eye model and can act as an inherent route for cannulating the internal space of the eye model in order to alter the viscosity of the liquid state of the eye model. Constructing a simulated optic nerve into the eye model provides for an inherent route for cannulating the internal space of the eye model in order to alter the internal pressure of the model. The simulated optic nerve in the surrogate eye model also serves as an inherent route for introducing optical or mechanical instruments or recording devices into the internal space of the eye model via catheterization.

Specifically, a silicone-based master mold is created to form the contents of the inner eye. FIG. 1A-1E illustrate the key parameters that define the master mold. As set forth in A the diameter of the spherical globe section for establishing the sclera is illustrated. In B, the diameter of the corneoscleral chord for establishing the cornea section is represented. C depicts the sagittal height of the cornea section. In D, the diameter of the section used to cast the optic nerve is illustrated. Finally, in E the length of the optic nerve section is shown. In addition, the orientation of the optic nerve section to the posterior chamber section is defined by a specific angle. In certain embodiments, any of these parameters can be redefined to create a new master mold if a specific size or shape of eye is required. High volume production of eye models is performed by simultaneously using multiple copies of the master molds.

Figures 1F, 1G:
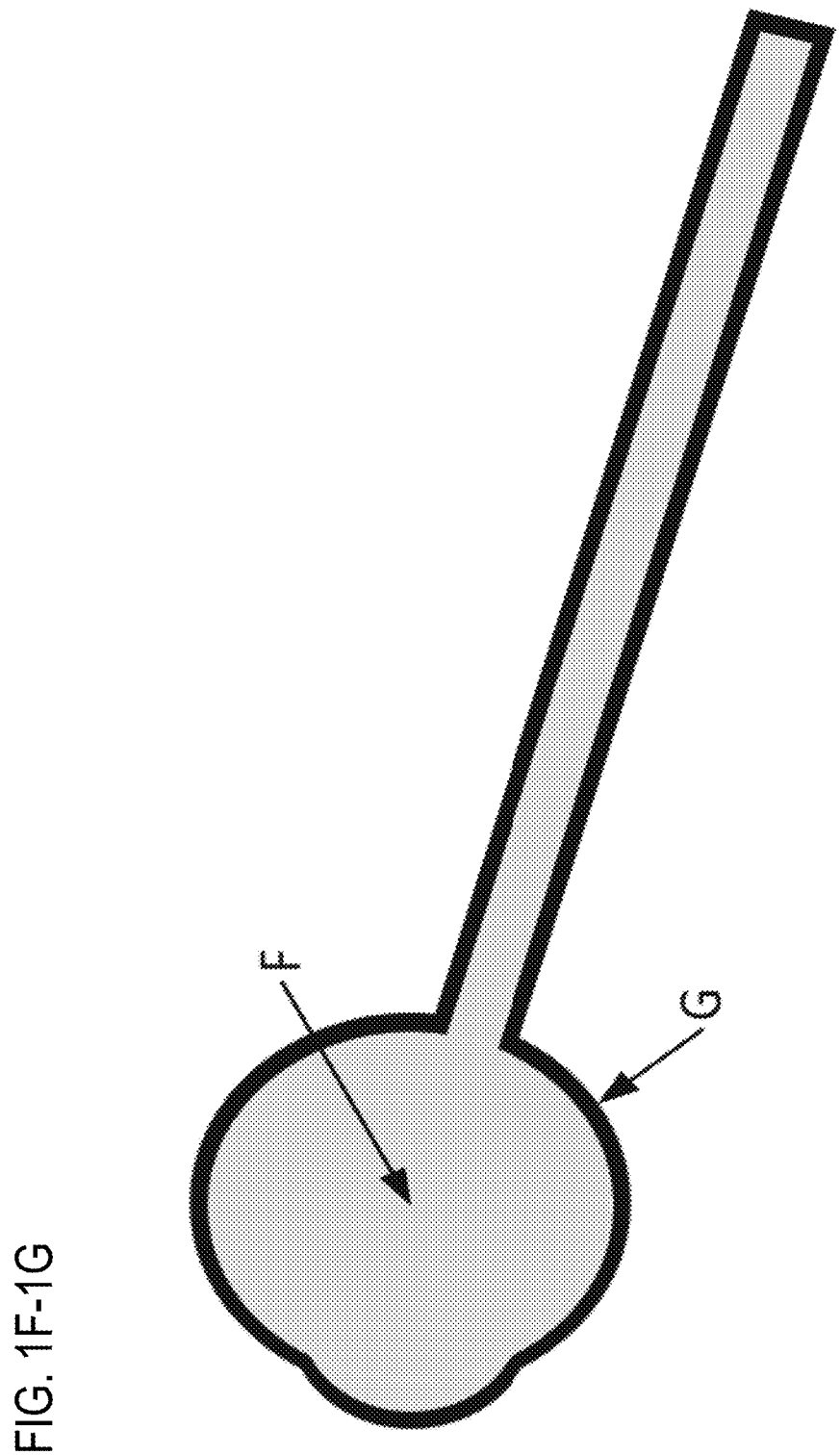

The silicone-based master mold is used subsequently to cast gelatin-based representations of the inner anterior and posterior chambers of the eye, plus an attached optic nerve, as represented by F in FIG. 1F-1G. Once the inner eye component is completely gelled, after demolding, it is submerged into a sodium alginate solution (Sigma W201502). Hybridized hydrogels can be made by the addition of other cross-linked polymers, but it is the calcium crosslinked alginate matrix that defines the form. A hydrogel coating G made from alginate is then deposited onto the eye. Cross-linking of the hydrogel coating is made possible by calcium molecules contained within F. In some embodiments, the calcium ion concentration in the gelatin core F is between about 0.5% and about 3% w/v, optionally between about 1.5% and about 2.5% w/v. In some embodiments, the calcium ion concentration in the gelatin core F is about 2% w/v. The thickness of the coating, G, is controlled largely by adjusting the time of exposure of the gelatin component to the alginate solution.

Additional modification of the mechanical properties of the hydrogel can be established by modifying the pH acidity level or the temperature of the alginate solution, as well as the concentration of the gelatin and the alginate formulations. In some embodiments, the concentration of the alginate in the alginate solution is between about 0.5% and about 3% w/v, optionally between about 0.75% and about 2% w/v. In some embodiments, the concentration of the alginate in the alginate solution is about 1% w/v. The hydrogel coating can be further hybridized by the addition of other molecules that can increase the strength and resilience of the coating, and allow it to have a biomechanical performance that is more similar to that of living ocular tissue. In particular, the addition of collagen, long-chain polysaccharide molecules, and ultraviolet (UV) light sensitive cross-linking molecules and activators to the alginate solution can be used to create a stronger synthetic tissue than is possible with the relatively weaker alginate-based hydrogel alone. However, the alginate hydrogel shell is critical to the eye formation process because it establishes precise dimensional shape to the eye model prior to the use of UV light crosslinking of other long-chain molecules that subsequently establish the strength of the simulated corneo-scleral shell.

Warming the gelatin core F of FIG. 1 causes the gelatin to liquefy within the hydrogel shell. Cutting the distal end of the simulated optic nerve creates a port that allows the liquid to be drained from the eye model. The gelatin contents of the eye model can thus be replaced with a liquid of any desired viscosity. For example, the gelatin contents of the eye model can be replaced with physiologically balanced saline solutions, optionally including added nutrients for perfusing the eye model. In other embodiments, liquids of varying viscosity can be used. More specifically, the port into the eye can be a means to cannulate the eye to a manometer system such that the internal pressure of the eye model can be adjusted to mimic the physiological intraocular pressure (IOP) found in the living eye.

Figures 1H, 1I, 1J:
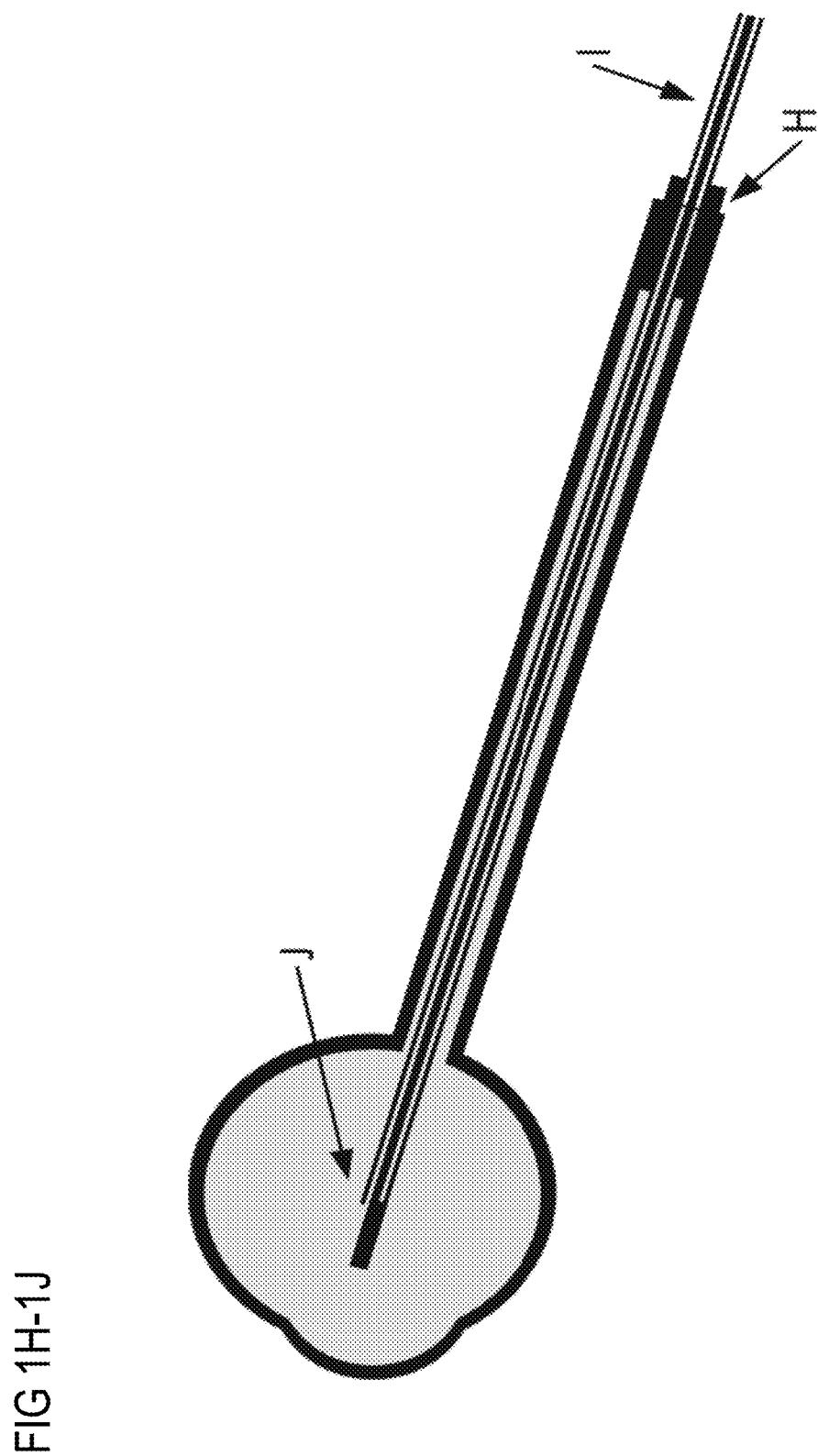

This process is illustrated in FIG. 1H-1J in which a pressure sealable port at H is established at the distal end of the simulated optic nerve. Surgical tubing or other slender, flexible objects I can be introduced through the port to inflate the eye with fluid or acquire data. For example, fiber optic-based pressure transducers are one possible device that can be used within the eye model in J without the need to pass through the wall of the eye itself, which could negatively affect the structural integrity of the shell. In addition to replacing the gelatin core of the eye model with another form of liquid, other variations of the model are claimed.

Figures 1K, 1L, 1M:
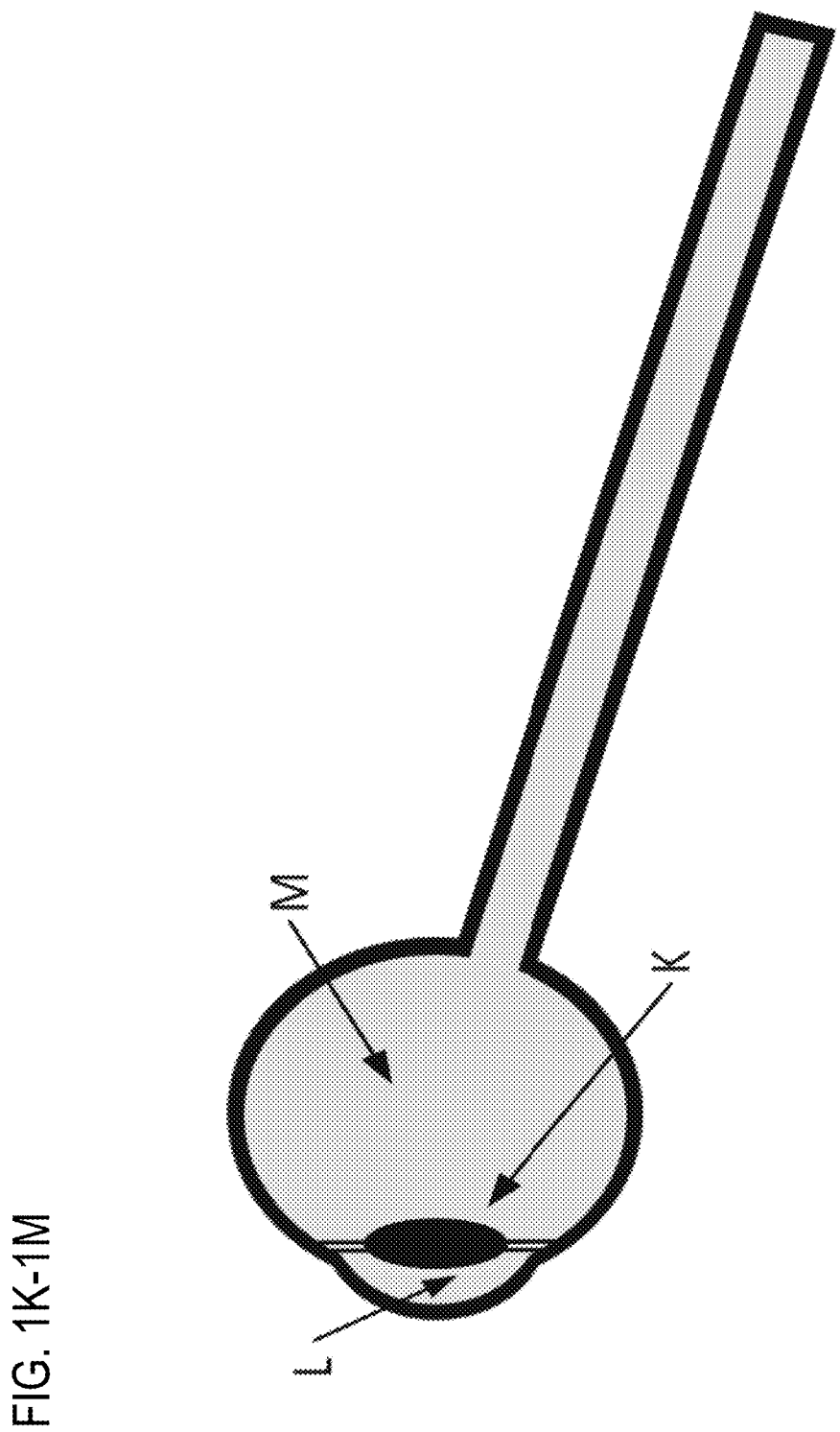

In one embodiment in FIG. 1K-1M, a version of the surrogate human eye model includes a synthetic representation K of the crystalline lens of the living eye that is constructed from gelatin and alginate-based hydrogel materials and then manually deposited within the gelatin core during the molding process. The modeled lens is held in place by the presence of the solidified gelatin itself, although an annular peripheral membrane constructed of alginate allows anchoring of the lens to the simulated corneoscleral shell of the eye model. In addition, localized heating of the gelatin by means of an applied warming tool will temporarily liquefy the gelatin within the anterior chamber L, while maintaining a solid gelatin structure in the posterior chamber M. Furthermore, the posterior chamber can be partially warmed, producing a semi-solid gelatinous structure. The ability to manipulate the eye model with localized variations of applied heat permits the eye model to have a fully liquefied simulation of the aqueous humor in the anterior chamber and a semi-solid simulation of the vitreous humor, which is consistent with variations of the living eye in different stages of life. When combined with the ability to replace the original gelation with any other liquid, including other forms of gelatin with different bloom strengths, the eye model becomes an even better simulation of the living eye. The eye model is designed to be used with an eye holder that simulates the soft tissue of the ocular orbit that holds the eye in place. This holder is designed to slide into a dimensionally realistic simulated bony orbit model of the skull, thereby allowing the simulated optic nerve to pass through the foramen at the back of the orbit and enter the region of the optic chiasm within the cranium where the lumen of the simulated optic nerve can be cannulated or catheterized.

Figure 2:
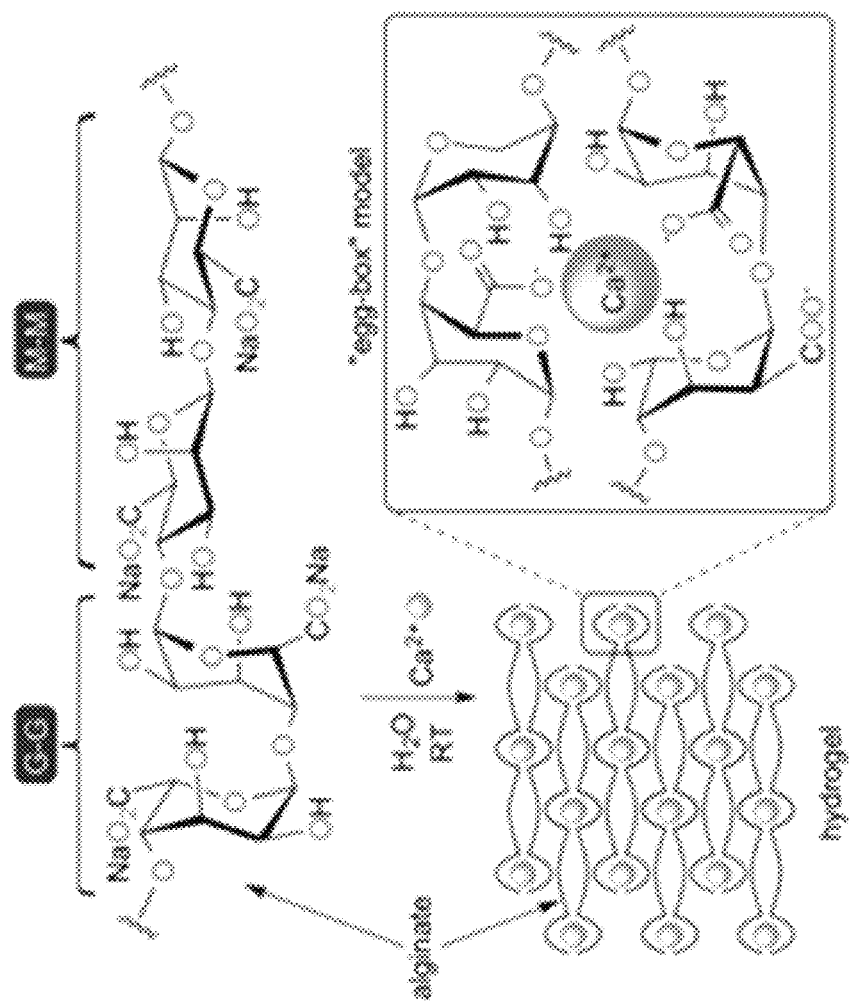
FIG. 2 is a representation of a hydrogel matrix used in the surrogate human eye model comprising: a) a gelatin core having a sclera, an anterior chamber, a posterior chamber, a cornea and an optic nerve attached to the gelatin core and (b) an outer shell structure wherein the surrogate human model eye is made from a silicone-based master mold and dimensioned for replacement of post-mortem ocular tissue.
Figure 3:
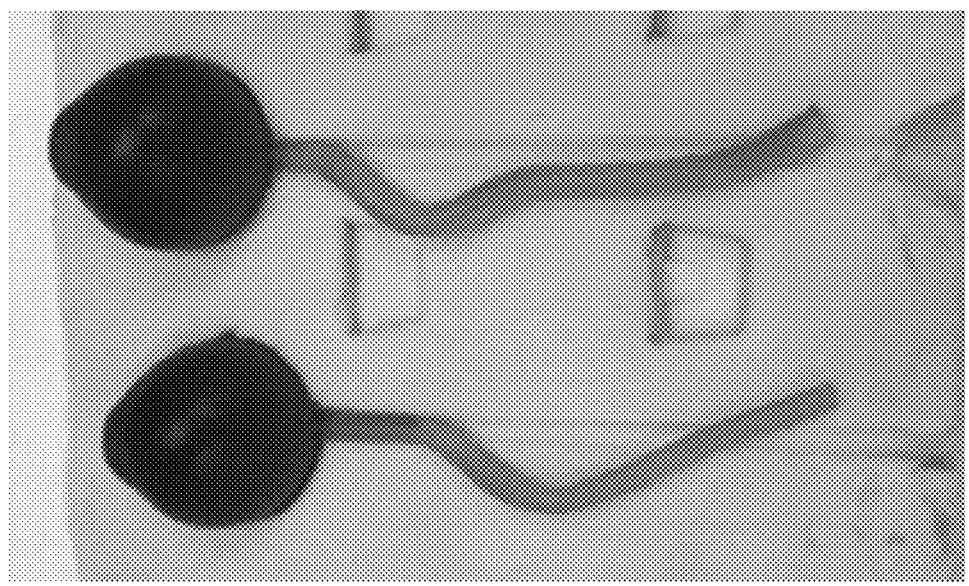
FIG. 3 is a photograph of porcine gelatin that is mixed with a calcium chloride solution injected into a silicone mold that includes a human eye and optic nerve.
Figure 4:
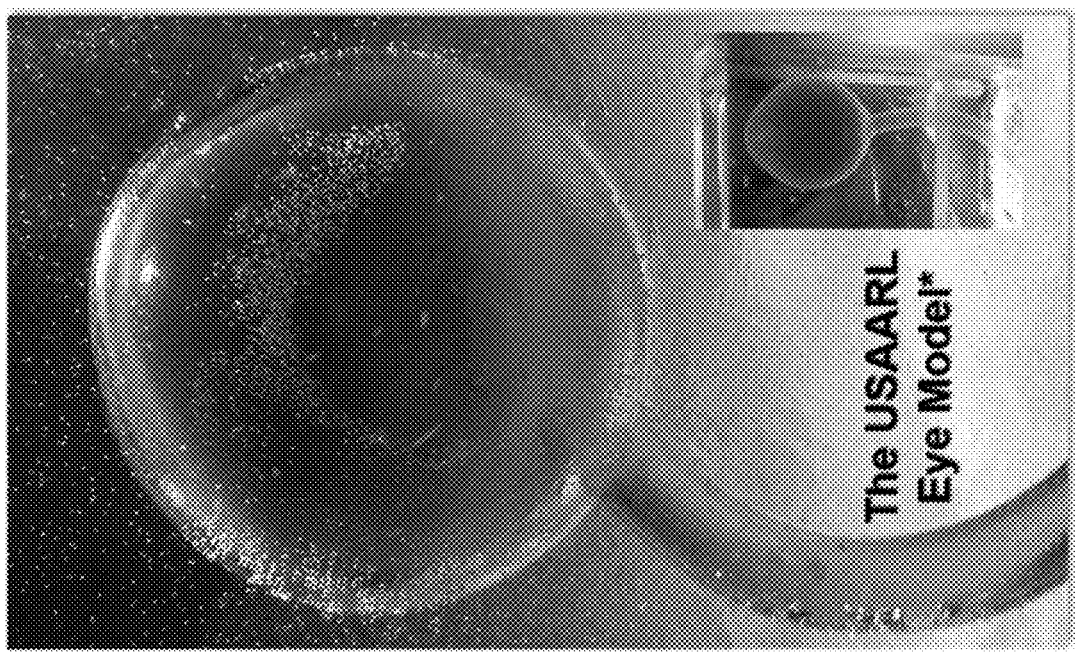
FIG. 4 is a representative surrogate human eye model.

In certain embodiments, the surrogate eye model is based on a hydrogel matrix as shown in FIG. 2. The hydrogel matrix can be modified by those of ordinary skill in the art to a required specification. Beginning as porcine gelatin (Sigma, St. Louis, MO G2500), calcium chloride solution (Sigma C1016) is mixed and the resulting matrix is injected into silicone molds as previously described of the internal volume of the human eye and optic nerve as shown in FIG. 3. Completed eye models as shown in FIG. 4 are stored at 5 degrees Celsius or used immediately.

Uses of Surrogate Human Eye Models

Uses for Applicant's eye model include the following: (i) a test sample for ocular shock wave testing; (ii) a test sample for ocular blunt impact testing; (iii) a test sample for ocular incisional trauma testing; (iv) a test sample for directed energy testing; (v) a test sample for protective spectacle testing; (vi) a test sample for protective goggle testing (vii) a test sample for ocular surgical procedure simulation; (viii) a test sample for ocular clinical procedure simulation; and (ix) a test sample for ocular laboratory procedure simulation. Further uses for Applicant's eye model include the following: (x) a tissue engineering scaffold for culturing epithelial cells; (xi) a tissue engineering scaffold for culturing endothelial cells; (xii) a tissue engineering scaffold for culturing fibroblast and keratocyte cells; (xiii) a tissue engineering scaffold for growing collagen; and (xiv) a tissue engineering scaffold for artificial tissue generation. Finally, Applicant's invention may be used (xv) as a physiological model for testing biological or chemical product safety; (xvi) as a physiological model for testing cosmetic product safety; (xvii) as a physiological model for testing radiation-based product safety and (xviii) as a simulated eye for theatrical, film, television, and video productions. Specific embodiments are directed to methods of practicing blast research and testing on a surrogate human eye model comprising: supplying a surrogate human eye model comprising: (a) a gelatin core; (b) a sclera; (c) an anterior chamber; (d) a posterior chamber; (e) a cornea; (f) an optic nerve and (g) an outer shell structure, wherein the surrogate human model eye is made from a silicone-based master mold and dimensioned for replacement of post-mortem ocular tissue.

EXAMPLES

The invention is illustrated herein by the experiments described by the following examples, which should not be construed as limiting. The contents of all references, pending patent applications and published patents, cited throughout this application are hereby expressly incorporated by reference. Those skilled in the art will understand that this invention may be embodied in many different forms and should not be construed as limited to the embodiments set forth herein. Rather, these embodiments are provided so that this disclosure will fully convey the invention to those skilled in the art. Many modifications and other embodiments of the invention will come to mind in one skilled in the art to which this invention pertains having the benefit of the teachings presented in the foregoing description. Although specific terms are employed, they are used as in the art unless otherwise indicated.

Example 1. Materials and Methods

The surrogate human eye model is a simulated corneoscleral shell made by a casting process in which a complete, three-dimensional (3D) structure is formed at one time as a continuous layer of hydrogel material enclosing a temporary inner core of molded gelatin that represents the anterior and posterior chambers of the eye. The inclusion of a distinct and realistic corneal shape on the model is helpful for external alignment of the model when it is mounted into a headform at a specific orientation. Additionally, a simulated optic nerve is included during casting so that its tube-like external sheath is integrated structurally with the corneoscleral globe of the eye model and extends between the eye globe and the optic canal opening at the back of the orbit. The inclusion of this simulated optic nerve is a key feature of this model because human donor eyes or excised animal eyes typically have the optic nerve severed immediately during the enucleation procedure, making them essentially useless for understanding how the optic nerve is subjected to shearing or tractional stress during a blast event. This simulated optic nerve also creates a port of entry into the model for the introduction of instrumentation via a catheter system, as well as inflation of the globe to a specific intraocular pressure (IOP) in order to place the corneoscleral shell under normal tension. This arrangement for instrumenting the eye model via the cranium reduces the likelihood that the embedded recording instrumentation will interfere with the propagation of the shock wave, and should therefore yield measurements with better accuracy.

Another important feature of the eye model is the application of an inner core of gelatin that determines the final shape of the model. This inner core also provides the necessary structural support during storage and transportation of the eye model. The inner core can remain in situ as a single piece of gelatin subject to fracturing from overpressure during blast testing, or it may be partially melted in situ to model a fully liquid aqueous humor and a semi-gelatinous vitreous humor. More often, the inner core will be removed completely in preparing the model for use, and subsequently replaced by other fluids to pressurize the globe, such as physiologically balanced saline solutions with added nutrients for perfusing the eye model, or fluids of varying viscosity to understand the effects of intraocular media density on overpressure amplitude and shock wave propagation.

Twelve versions of the eye model's inner core (i.e., the master eye models) were made from turned birch wood. Birch wood was used for designing the initial prototype to keep the prototype development cost low. Each master eye model version had slightly different dimensions for the anterior chamber (AC) depth, diameter, and profile in order to determine the effects of the AC shape on the outcome of the corneosceral shell. Wood dowels that were approximately 100 millimeters (mm) in length were added to simulate an optic nerve on each master eye model. These dowels were inserted at an anatomically correct location and orientation with respect to the posterior pole of the master eye mode with slight variations permitted (FIG. 1A-E). Because the prototype eye model is not specific to either the right or left eye, the insertion location of the simulated optic nerve does not take into account the small vertical offset of the true optic nerve insertion relative to the posterior pole of the globe. The acceptable mean values and standard deviations for the dimensions of the anterior and posterior chambers were obtained from published anatomical data for the adult human eye, including references to magnetic resonance imaging (MRI) of the living eye.

Figure 17:
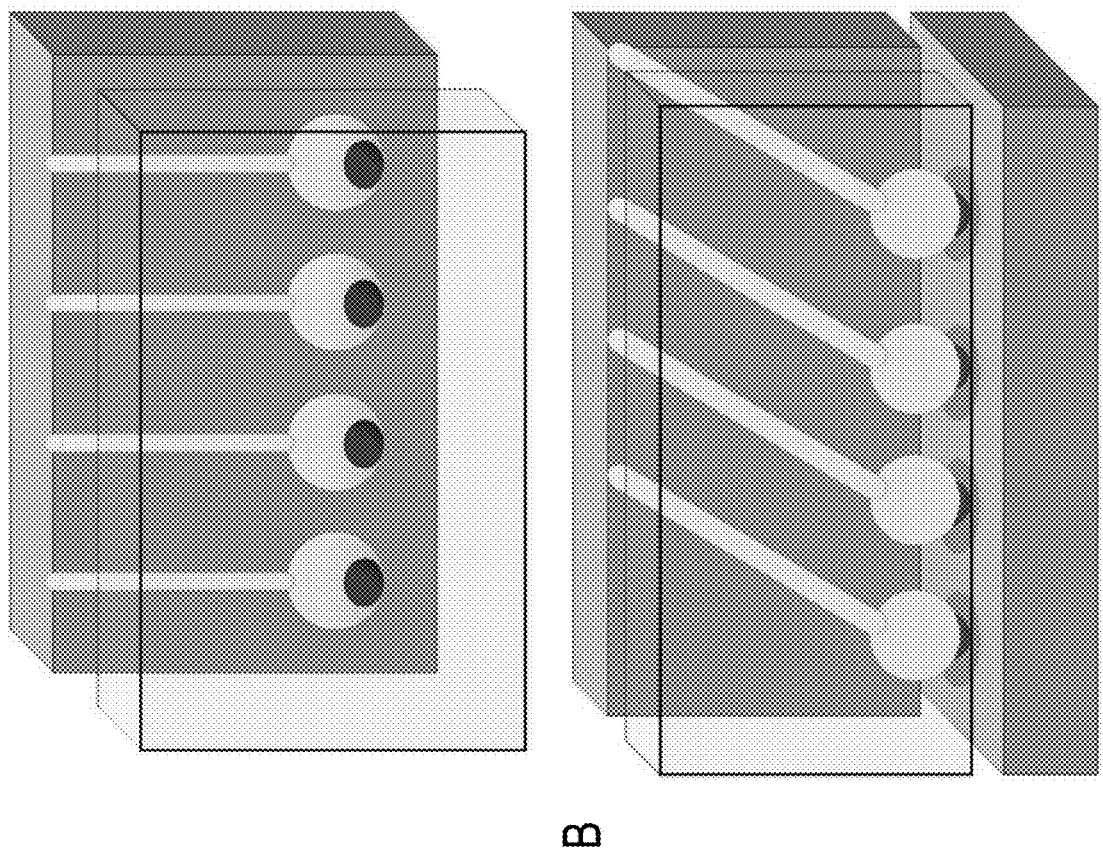
FIG. 17A-B illustrates representative silicone master molds used to create the surrogate human eye models of the invention.

Six out of the 12 wood master eye models were selected based on their overall construction quality to create both two-part (FIG. 17A) and three-part (FIG. 17B) silicone master molds for subsequent injection casting of the inner core of the eye model. The master molds were made with a two-part room temperature vulcanizing (RTV) silicone material (GI-1110, Silicones, Inc., High Point, NC) that was mixed according to label instructions. It was degassed in a 5-gallon vacuum chamber for 15 minutes (min) at −20 inches (in.) of mercury (inHg) vacuum pressure prior to pouring in order to remove air bubbles introduced during mixing.

Replicas of the internal volume of the human eye were created for silicone-based master mold-making with each replica having an average posterior chamber diameter of 24.8±0.42 mm; a back-surface corneal sagittal distance of 3.47±0.17 mm; and a limbus-to-limbus inner corneal diameter of 12.2±0.11 mm (N=12). A simulated optic nerve of 3.62±0.07 mm thickness and a working length of approximately 50 mm was attached to the eye replica. These replicas were used to cast multi-part RTV silicone master molds (GI-1110, Silicones, Inc., High Point, NC).

The two-part silicone molds were designed to make eye models of the corneoscleral shell and attached optic nerve without the option of having additional internal ocular anatomy modeled. The two-part mold uses a single injection of liquid gelatin to produce the inner core of the eye model. Each of the six wood master models was embedded into non-hardening oil-based tin clay that covered one-half of the globe and optic nerve in order to form the first half of the RTV silicone mold. After allowing this first half to cure overnight, the clay was removed, a release agent applied to the cured silicone, and the second half of the silicone mold was poured and allowed to cure, thus completing the mold. The distal end of the wood dowel representing the optic nerve for each eye model formed the till-port for casting the inner core.

The three-part molds were designed to allow experimentation in terms of adding internal components to the eye model, particularly a simulated iris and simulated crystalline lens with a supporting structure. The three-part mold design permits multiple injection events that build the internal components of the eye model in layers between the anterior and posterior chambers. The three-part molds required two sections of embedding clay, one for producing one-half of the posterior section of the globe and attached optic nerve, similar to the two-part mold-making process, and one for the complete anterior segment portion of the globe. The two posterior mold sections were poured individually in two separate steps in a manner similar to the two-part mold, followed by pouring of the anterior section of the mold as the third and final step of the master mold-making process.

The silicone-based master molds were then used to cast gelatin replicas consisting of 150 mL of distilled water, 3 g of calcium chloride (C1016, Sigma-Aldrich, St. Louis, MO), 8 g of bovine gelatin (G9382, Sigma-Aldrich), and 1 drop of optional food coloring added to improve visualization of the gelled structure. Once formed, the gelatin replicas were removed from the mold and placed into a de-gassed alginate solution consisting of 500 ml of distilled water and 8 gm of sodium alginate (41900060-1, bioWORLD, Dublin, OH), with the pH adjusted by a buffer to a value of 7, if needed. Calcium ions exposed across the surface of the gelatin ionically crosslinked the alginate, creating a hydrogel-based shell that simulates the corneo-scleral shell of the living eye. The thickness and strength of the hydrogel shell was controlled by the pH, temperature, and length of time during processing.

After a period of 5 to 10 minutes of exposure to the alginate, the completed model eye was removed from the solution and allowed to drain for 1 minute cornea-side-up while exposed to air. The model eye was then rinsed in a bath of distilled water to remove excess uncross-linked alginate. The resulting surrogate eye model has been shown to be amenable to long-term storage under refrigeration in a water bath or a moist chamber until use. The ideal long-term storage method remains under consideration, and may include the use of a refrigerated, pH-balanced storage media with an antifungal preservative.

Additional supporting equipment were included during development of the eye model, including a skull-based headform to provide a standard, anatomically accurate ocular orbit, an intraorbital eye holder to replicate soft tissues and precisely position the model, a manometer system to pressurize the eye model, and a leak-free, multi-port catheter system that allows the pressurized eye model to be instrumented with fiber optic pressure sensors or other devices that can be passed into the eye through the optic nerve sheath.

Example 2. Surrogate Eye Model Dimensions and Characteristics

Figure 5:
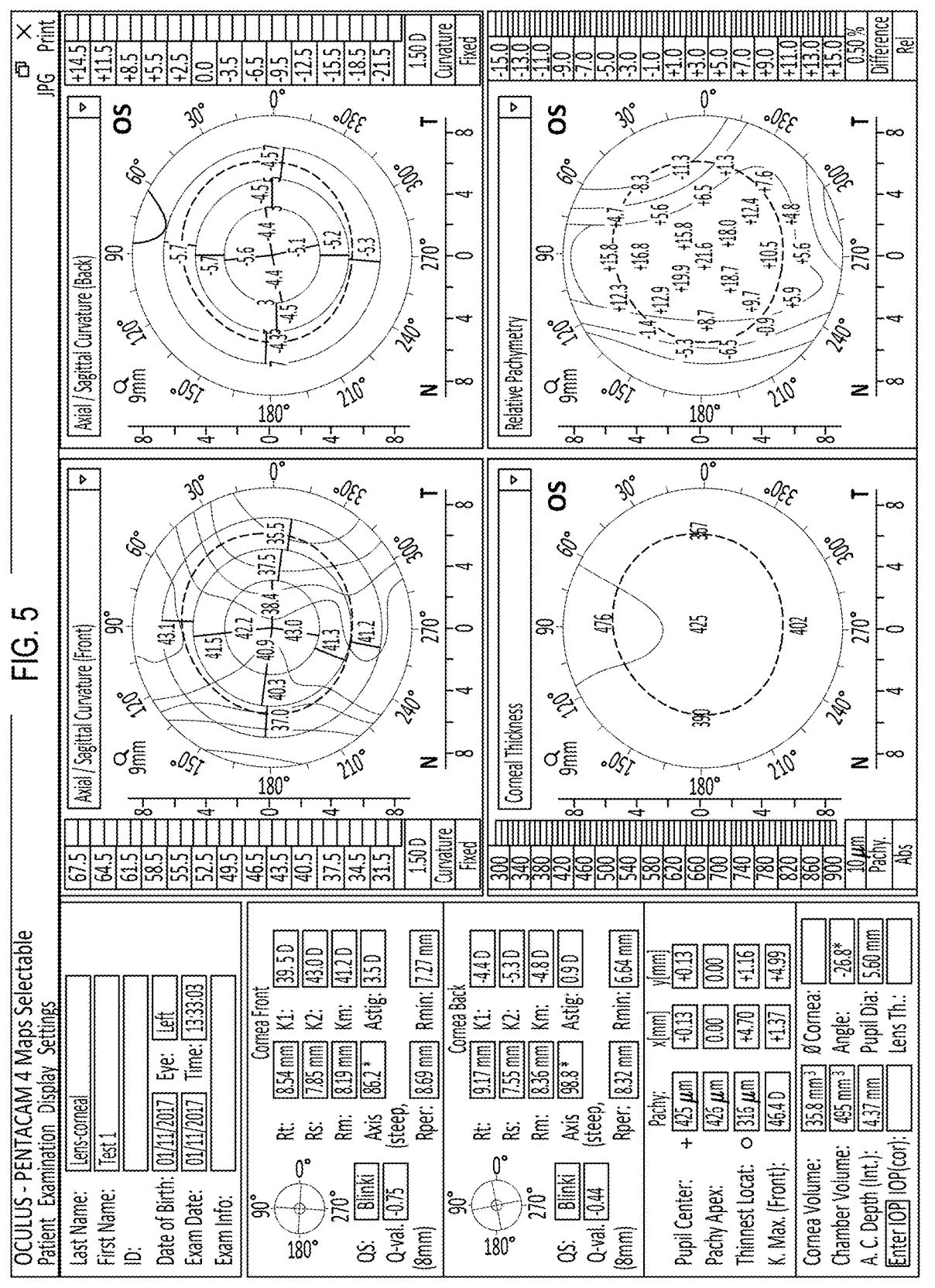
Figure 6:
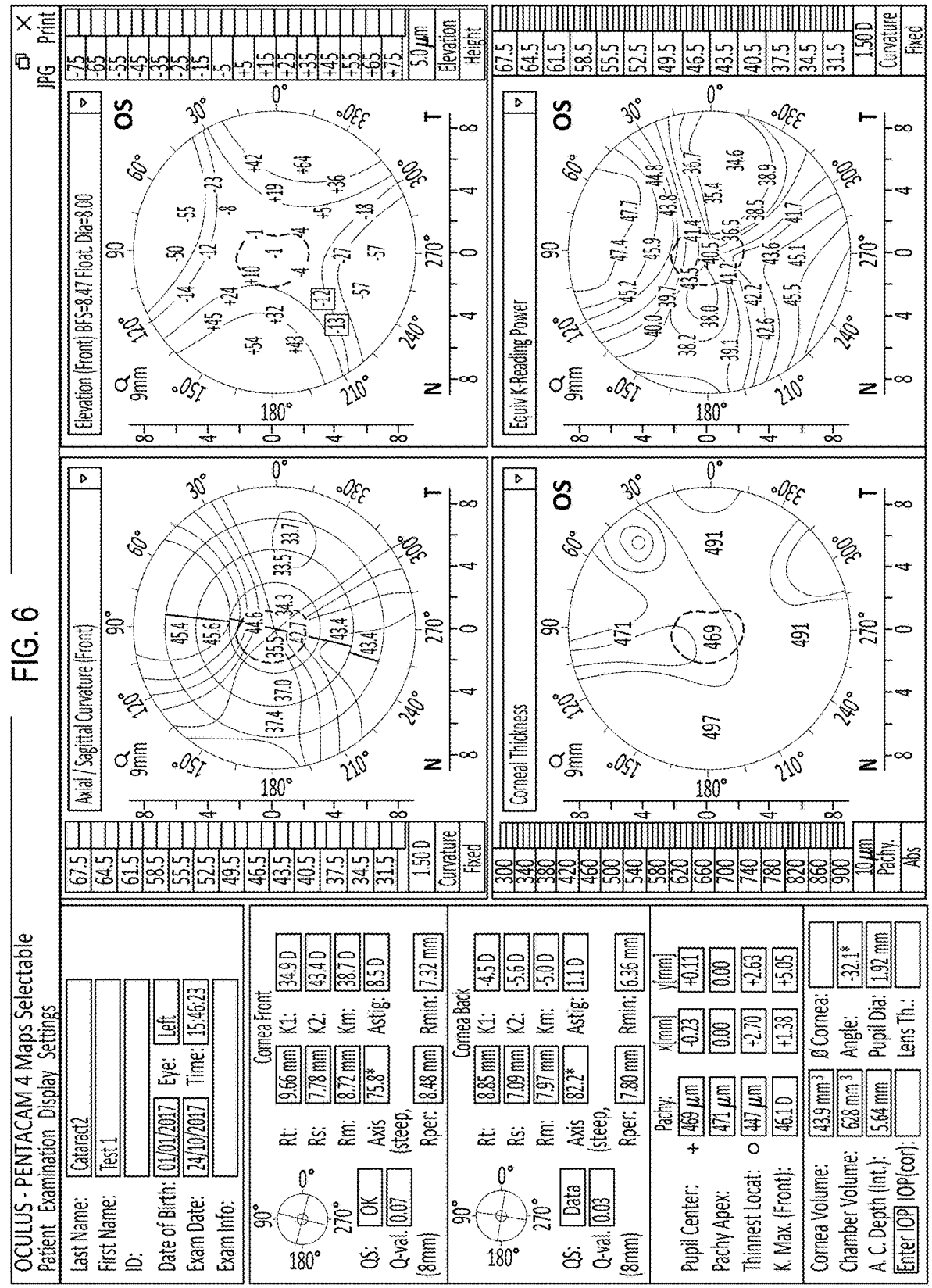
FIG. 6 is a schematic representing the shape of the eye material cornea as seen with Pentacam® HR tomographic scanning.

The shape of the surrogate human eye model cornea may be seen with a Pentacam® HR tomographic scanning. Such a model as shown in FIG. 5 and FIG. 6 exhibits dimensional and shape characteristics very similar to that of the living eye when produced under controlled conditions.

Figure 7:
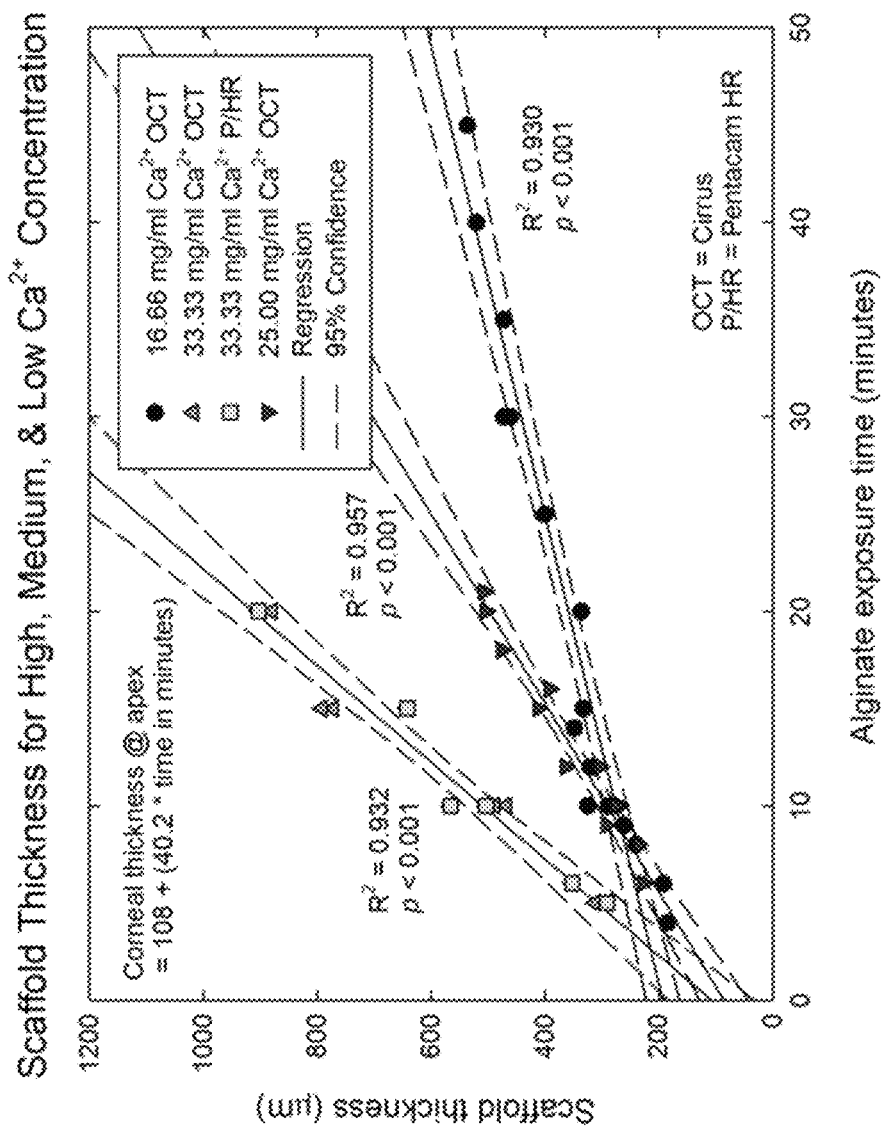
FIG. 7 is a graph illustrating the rate of alginate deposition and overall scaffold thickness.
Figure 8:
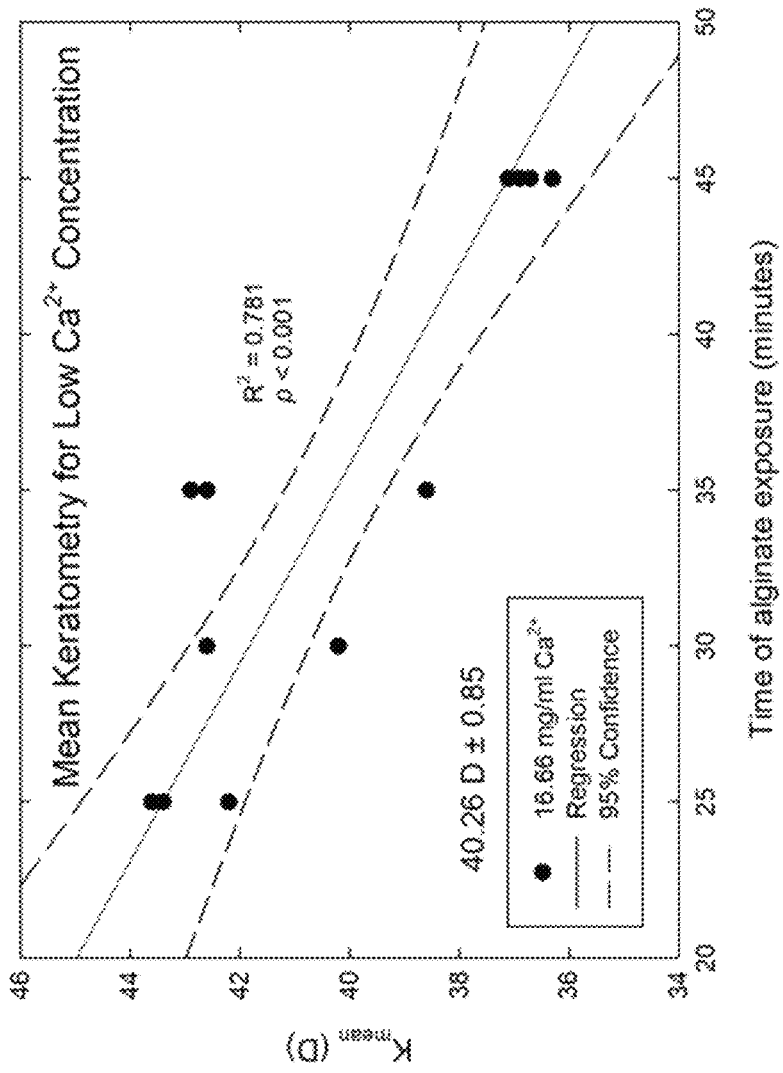
FIG. 8 is a graph illustrating thickness of the scaffold increasing with rate of alginate exposure.
Figure 9:
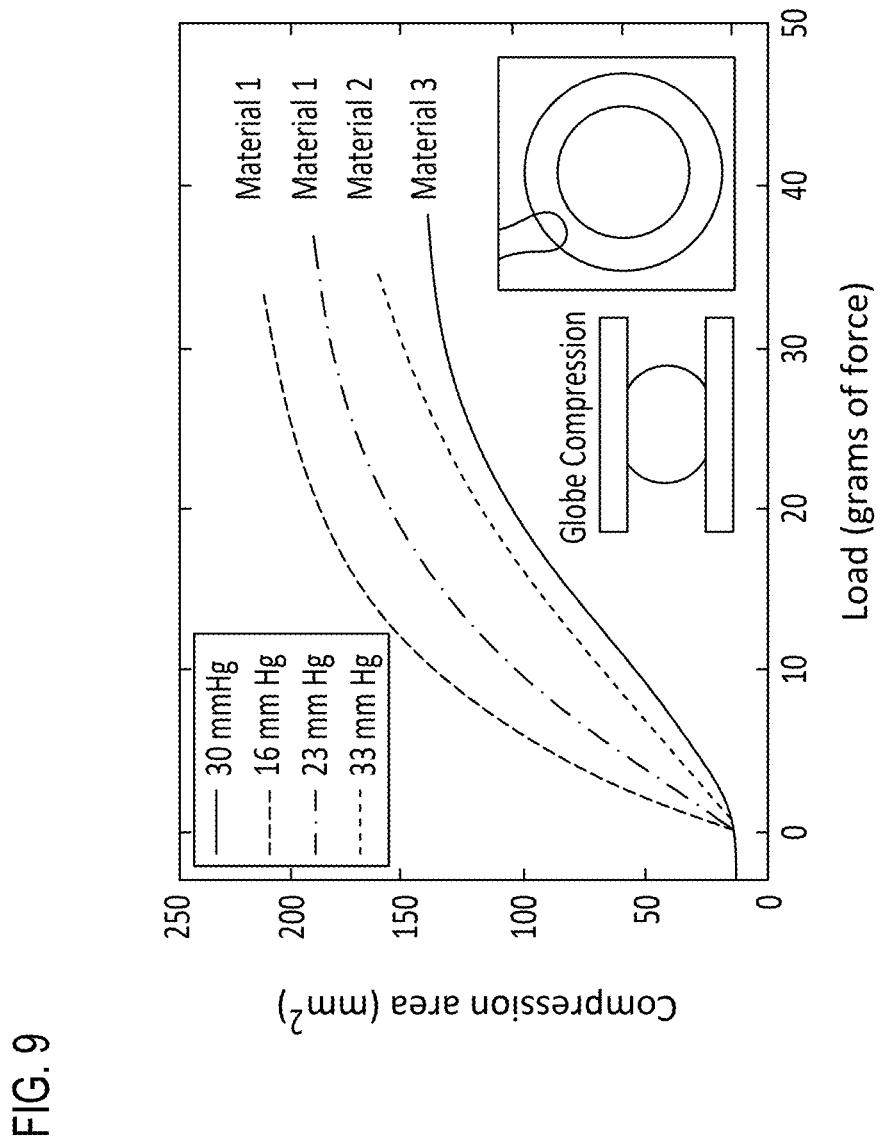
FIG. 9 is a graph illustrating globe compression between glass plates as a means of evaluating the surrogate human eye model's resistance to deformation.
Figure 10:
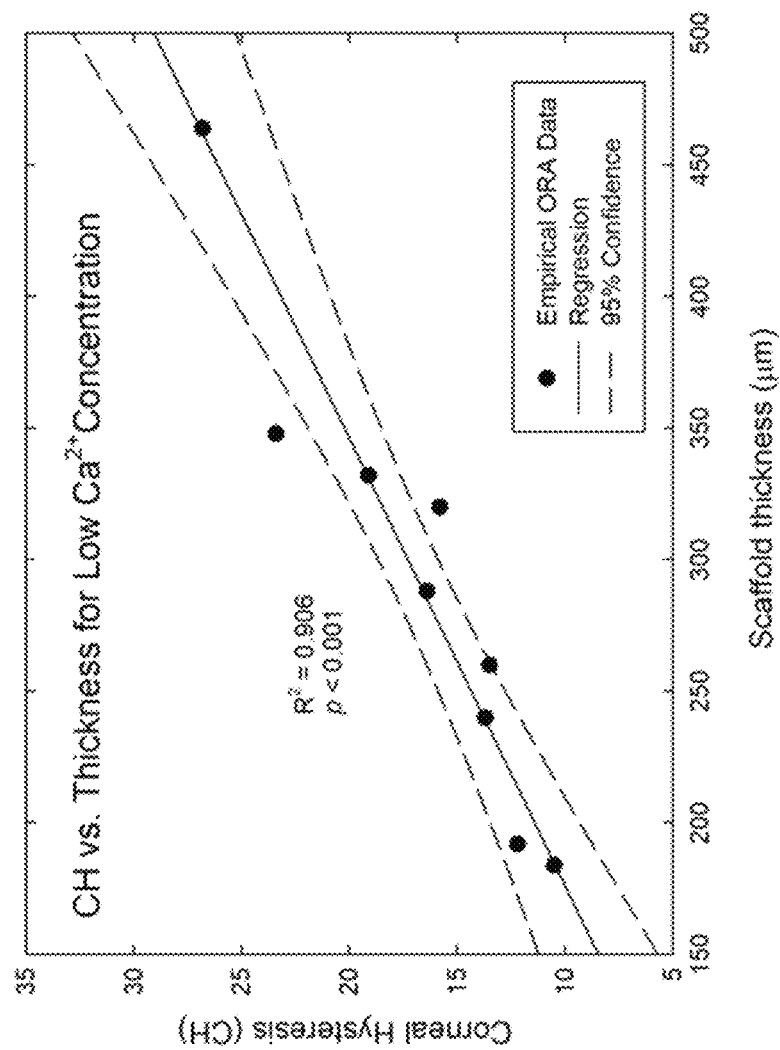
FIG. 10 is a graph illustrating thickness of scaffold increasing due to biomechanical properties of the surrogate human eye model.
Figure 11:
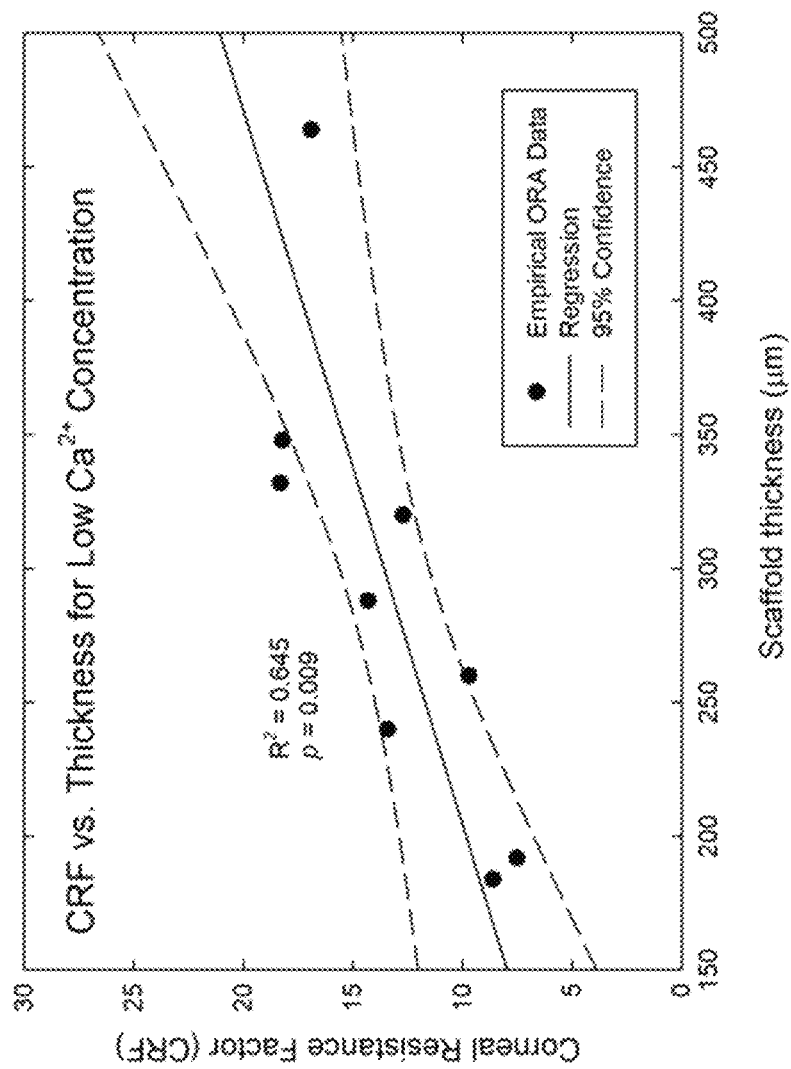
FIG. 11 is a graph illustrating increase of thickness in scaffold and the surrogate human eye model's resistance to force of applanation.

Example 3. Control of Overall Scaffold Thickness Via Rate of Alginate Deposition The corneo-scleral shell thickness depends on temperature, pH, and the concentration of the calcium and alginate solutions, as well as the exposure time of the alginate to calcium. Significant linear relationships exist between the scaffold thickness and various shape, dimensional, and biomechanical parameters as shown in FIGS. 7-10. Corneal Hysteresis (CH) and Corneal Resistance Factor (CRF) are shown to be linearly related to schaffold thickness. The rate of alginate deposition and thus the overall scaffold thickness is controlled by the concentration of the calcium ions and the time of alginate exposure as seen in FIG. 7. Additional factors that control thickness include the concentration of the alginate, the temperature, and the pH of the solutions. As shown in FIG. 8, as the thickness of the scaffold increases with the time of the alginate exposure, the radius of curvature of the shell is increased, resulting in flattening of the cornea. In FIG. 9, globe compression between glass plates is used as a means of evaluating the model's resistance to deformation. Fluids are generally incompressible therefore the shell structure must deform to accomodate the effects of the applied load. This deformation is nonlinear and consists of localized bending and stretching. It is not purely elastic but viscoelastic due to the high water content of the hydrogell shell that must be displaced as the shell deforms. The curves also exhibit different nonlinear behavior due to variations in the initial boundary conditions of the intraocular pressure (IOP). As the thickness of the scaffold increases, the biomechanical properties of the eye are altered. This is illustrated in FIG. 10 by the measurement of corneal hysteresis (CH) in response to air pressure appllanation using an ORA device CH is a measure of the viscoelasticity of the material that is the elastic response combined with unbound water movement. As seen in FIG. 11, as the thickness of the scaffold increased, the surrogate human eye model increasingly resisted the force of applanation. This was illustrated by the measurement of the CRF value and quantifies the resistance to shearing forces around the perimeter of the applanated area.

Example 4. Characterization of Pressures Using Focused Blast Energy

Figure 14:
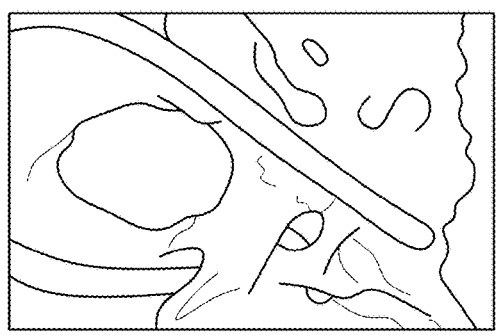
FIG. 12-FIG. 16 are photographs representing preparation of the surrogate human eye model for testing involving an attached cannula port to the distal end of the simulated optic nerve in FIG. 12. The surrogate human eye model is loaded into an orbit in a holder representing surround adnexal soft-tissues of the eye in FIGS. 13, 14, 15.
Figure 16:
Figure 12:
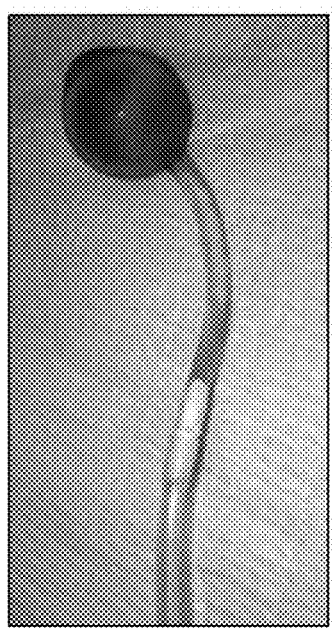
Figure 13:
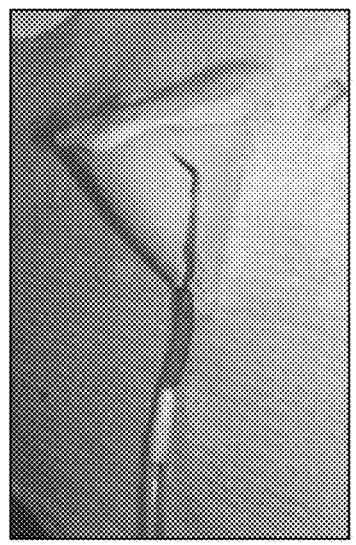
Figure 15:
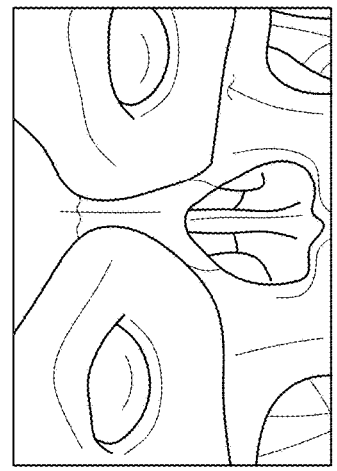

The surrogate human eye model was coupled with a synthetic skull to better characterize the pressures achieved by reflected and focused blast energy within the ocular orbit. The eye model was prepared for testing. A cannula port was attached to the distal end of the simulated optic nerve as shown in FIG. 12. The gelatin was replaced via warming with a fluid of known viscosity (e.g., mineral oil). The eye model was loaded into the orbit in a holder representing the surrounding adnexal soft-tissues of the eye as shown in FIGS. 13, 14, and 15. Fiber-optic pressure sensors (FISO, Inc., Quebec, QC.) were positioned at key locations within the eye or optic nerve model via a catheter as shown in FIG. 16. The intraocular pressure (IOP) was adjusted by inflating the eye to the desired volume. Future studies will report on the success of the surrogate human eye model for evaluating ballistic eyewear for blast energy leakage into the eye, optic nerve, and ocular orbit.

Example 5. Measurement of Thickness of Surrogate Model Eye's Cornea

Thickness of the surrogate human eye model's cornea was measured by a Cirrus® OCT optical coherence tomography system (Carl Zeiss Meditec, Inc., Dublin, CA) and a Pentacam® HR tomography system (Oculus, Inc., Arlington, WA). A 500 μm thick cornea was achieved in approximately 8 minutes with the current formulations, and a 1-mm thick shell in approximately 10 minutes. Adjustments in the processing technique are being explored as a means to create localized variations in thickness of the corneo-scleral shell. Corneal topographic shape has been measured with the Pentacam® HR and typically shows anterior axial curvature values of approximately 42 diopters, which is in close agreement with the normal human cornea. Corneal astigmatism has been created through a biomechanical coupling process when the model eye experienced strain along a given axis caused by the current eye mounting process within a replica of the orbit. A parallel light beam introduced into the cornea was seen to come to a focus near the back of the globe, although the current model is of an aphakic eye. Experimentation with the creation of a simulated lens and lens capsule to produce a phakic model has been conducted in the laboratory, but the inclusion of a lens is not a primary goal of the current model.

Example 6. Two-Part Mold Casting of Inner Core

The silicone master molds were closed without the use of any release agent. Acrylic backing plates of 4-mm thickness were applied to the sides and base of the silicone master mold and held in place with multiple rubber bands in order to provide structural stability to the master mold during inner core casting. Gelatin solution was mixed in batches sufficient for producing six inner cores with a reserve in case of spillage or leakage. Specifically, 3 grams (g) of calcium chloride granules (CI1016, Sigma-Aldrich, St. Louis, MO) were added to a 250-milliliter (−mL) beaker with 150 mL of distilled and deionized water at a pH acidity of 7.3 and a temperature of 70.0° Fahrenheit (F) (21.1° C.). Two drops of liquid food coloring (Neon!, McCormick, Inc., Hunt Valley, MD) were added to allow the inner core gelatin to be visible during the subsequent stages of the eye model casting process and during storage. The solution was stirred until the calcium chloride granules were completely dissolved. It was then equally divided between two beakers. One beaker was heated in a microwave oven until the solution was approximately 145° F. (62,8° C.). As the first half of the solution was heating. 8 g of porcine skin gelatin powder, Type A, with a 300-g bloom strength (G2500, Sigma-Aldrich, St. Louis, MO) was sprinkled across the remaining half of the room temperature liquid and slowly stirred to allow the gelatin to fully bloom (~90 seconds [s]). The heated solution was then added to the bloomed gelatin, and stirred slowly until the gelatin was incorporated fully into a liquid state. Slow stirring avoids incorporating air bubbles into the gelatin and the need to for degassing the solution. Additional experimentation included preparing inner cores with bovine skin gelatin powder, Type B, with a 225-g bloom strength (G9382, Sigma-Aldrich) using a similar protocol.

A 60-mL disposable syringe with a blunt-tip 16 gauge luer-lock needle and an attached 12-inch length of soft silicone tubing was used to inject the liquid gelatin solution into the silicone molds. Soft silicone tubing prevented damage to the inner walls of the silicone mold. The end of the tubing was inserted into the fill port, glided into the globe portion of the mold, and liquid gelatin was slowly injected while allowing air to escape from the top of the fill port. As gelatin emerged near the top of the fill-port, the injection continued as the tubing was removed in order to avoid trapping air within the optic nerve part of the mold. Each inner core requires a volume of slightly more than 15 mL of injected liquid gelatin, depending on the desired length of the optic nerve and any waste due to overflow. After all inner cores were filled, the silicone mold was allowed to rest undisturbed at room temperature until the gelatin had initially set (~60 min). The silicone mold was then placed inside of a refrigerator and chilled thoroughly to a temperature of 34° F. (1.1° C.).

Example 7. Three-Part Mold Casting of the Inner Core

Inner core casting with the three-part mold involved more steps than that of the two-part mold. First, the AC depression of the inner core in the third section of the mold was filled with gelatin and allowed to gel at room temperature. Because of the small volume involved, a 1-mL disposable syringe with a 21-gauge needle was used to fill the AC. Next, optional internal components (e.g., a simulated iris structure or a simulated crystalline lens) were positioned with surgical tweezers by placing them on top of the AC gelled component while aligning these with the geometric axis of the eye. Additional gelatin was then added to the anterior half of the inner core globe to fix the internal components in place after gelling at room temperature. Finally, the two remaining sections of the three-part mold were closed, and the final portion of the inner core representing the posterior chamber and optic nerve was injected through the fill port. Reheating of the gelatin reserve may be required when fabricating the inner cores with the three-part molds due to the additional time needed to assemble the internal components. Caution must be exercised during fabrication because injecting liquid gelatin that is too hot can cause the internal components to sink to the bottom of the mold or become misaligned.

Example 8. Demolding the Inner Cores

Failure to chill completely the mold for several hours will cause the inner cores to fracture during demolding, often at the location of the optic nerve attachment. Therefore, chilling overnight was performed in addition to keeping the lower half of the mold on a tray of wet ice during demolding. After removal of the silicone mold from the refrigerator, the acrylic plates were removed. When opening the two-part silicone mold, the mold was placed on its side (thus becoming the lower section) with the anterior chamber section of the inner core facing up. When opening the three-part mold, the mold was completely inverted and the third section (i.e., the anterior part of the inner core) was removed first by breaking the seal along the edge of this section and lifting upward by starting at one end. The remaining sections were laid on one side, and the process for demolding was similar to that for the two-part mold described below.

The seal of the two-part mold was broken by running the tip of a flat spatula completely around the mold parting line. Starting with the globe side, the top half of the silicone mold was lifted starting at one corner and continuing across all of the inner cores. A soft-bristle brush was used to prevent the optic nerve from being lifted away from the globe if it tended to stick to the top half of the mold. All of the inner cores along with their simulated optic nerves must remain on the bottom half of the mold.

Typically, the gelatin near the distal end of the optic nerve at the filling port was exposed to air and dried during refrigeration, causing it to stick to both sides of the mold. The spatula was used to slice off this dried end of the optic nerve section without damaging the silicone mold, thus allowing the upper half of the mold to be completely released from the lower half and set aside. Again, using the spatula, the distal end of the simulated optic nerve was cut to the desired length (typically 50 mm). The nerve was released completely from the mold by pressing the brush handle's blunt rounded tip (or a similar rounded tool with a diameter that fits into the silicone mold channel of the optic nerve), down and along the mold channel toward the globe, thereby gently lifting the gelatin out of the mold. Gently pressing the mold around the globe itself allowed the inner core to release from the silicone. Each inner core globe could then be removed by hand, taking care not to break off the attached optic nerve. Usually, the globe was grasped with the thumb and index finger and the optic nerve poiltion cradled by the remaining fingers. Laboratory gloves were worn during demolding to avoid the warmth of the fingertips from making fingerprint impressions on the inner core. Breakage of the optic nerve portion of the mold was usually attributed to rough handling, air trapped in the mold, inadequate chilling of the mold, or using an incorrect formulation of the gelatin that affected the bloom strength. Excess particles of gelatin were brushed off the inner core after demolding. After removal from the mold, the inner core was placed on its side at the bottom of a completely dry, low-profile, wide-diameter (~4 in.), flat-bottom container for casting of the corneoscleral shell.

Example 9. Casting the Corneoscleral Shell

The corneoscleral shell of the surrogate human eye model was composed of an adjustable polymer hydrogel made from ionically crosslinked alginate, which has been shown through numerous studies to be a biocompatible material suitable for tissue engineering applications.

Alginate (alginic acid) is a byproduct of brown seaweed (Phacophycae). It is a hydrophilic, anionic linear polysaccharide chain composed of D-mannuronic acid and L-guluronic acid residues that are connected via 1,4-glycosidic linkage. Alginate organizes into 3D polymer hydrogel structures when exposed to calcium ions, thereby creating complex "eggcarton" crosslinks where adjacent guluronic acids are co-located and become ionically bound.

The alginate material for creating the hydrogel scaffold was derived from a solution composed of 20 g of sodium alginate powder (41900060-1, bioWORLD, Dublin, OH) mixed with 2000 mL of distilled water at a pH of 7.3 and a room temperature of 70.0° F. (21.1° C.) for 5 minusing a blender set to a medium speed (e.g., speed setting #2 on an XL Blast blender, BL4000R, Black & Decker, Inc., Towson MD). The blended sodium alginate solution was poured into a beaker and degassed for ~30 min in a 5-gallon vacuum chamber at −20 inHg. The beaker was then removed from the vacuum chamber, covered tightly with cellophane, and stored overnight under refrigeration at 34° F. (1.1° C.). Prior to use, the liquid alginate solution was removed from refrigeration and allowed to return to room temperature (70.0° F.; 21.1° C.). Unused alginate solution was stored under refrigeration for later use.

The flat-bottom container holding the inner core was placed on a laboratory orbital shaker (Orbi-Shaker XL, Benchmark Scientific, Edison, NJ), Shaking speed was set to 110 revolutions per minute (RPMs), and the automatic timer was set to the period of time needed to create a specific thickness of the hydro gel scaffold. The exact time was determined by experimentation that established a linear functional relationship between scaffold thickness and immersion time as described in the Results. The calcium ions required for crosslinking the alginate into a 3D polymer scaffold came from the calcium chloride that was added to the inner core gelatin solution. The liquid sodium alginate solution was poured into the beaker away from the inner core, and the solution was allowed to rise from the bottom of the beaker to fully cover the inner core. Simultaneous with the pouring, the orbital shaker was started to prevent air from being trapped between the inner core and the hydrogel shell or within the hydrogel shell itself during crosslinking, as pouring the alginate solution directly over the inner core tended to trap air bubbles. The inner core was covered with alginate solution to a depth of approximately 15 mm while shaking. There was sufficient volume of the liquid alginate to allow the inner core to move freely both vertically and horizontally within the solution during shaking. It was critical that the distal end of the optic nerve remain free-floating and not contact the globe during this process to prevent fusion of the nerve sheath with the corneoscleral shell.

After the allotted time to create a shell of a desired thickness, the hydrogel-coated eye model was removed from the alginate solution and allowed to drain for approximately 60 s with the corneal surface facing up. This may be performed by cupping the eye model globe so that the optic nerve portion hangs down between two fingers of a gloved hand, or the globe can be placed on a cushioned rack that holds the eye model with the cornea facing up and the optic nerve hanging down to drain. The eye model was then placed in 400 mL of distilled water at 70.0° F. (21.1° C.), and shaken with the orbital shaker at 110 RPMs for at least 15 min to allow the hydrogel shell to continue to strengthen as the uncrosslinked excess alginate solution was rinsed away.

After rinsing, the eye model was stored under refrigeration at 34° F. (1.1° C.) within screw-cap jars filled with fresh, sterile distilled water. Eye models were typically screened later the same day or on the following day for quality control in terms of shell thickness uniformity and shell shape consistency using non-contact optical methods, namely optical coherence tomography (Cirrus®, Carl Zeiss-Meditec, Inc., Dublin, CA) and Scheimpflug imaging tomography (Pentacam® HR, Oculus, Inc., Arlington, WA).

Example 10. Hybridization of the Scaffold

The prototype of the eye model uses a basic alginate scaffold to define the shape and dimensions of the corneoscleral shell. Alginate scaffolds have viscoelastic properties that are desired for a hydrated interwoven polymer matrix, but they lack the resilience and mechanical strength imparted by collagen fibers comprising the extracellular matrix of living tissues. A variety of hybridized scaffolds incorporating alginate scaffolds with various synthetic or natural polymers are possible with this model, depending on the requirements of biocompatibility or strength. Hybridized hydrogel scaffolds have been described extensively in bioengineering literature. In particular, synthetic matrixes that incorporate polyvinyl alcohol (PVA) with sodium alginate in proportions desired for achieving specific strengths are being studied. Polyvinyl alcohol (PVA) can be crosslinked with freeze-thaw methods or ultraviolet (UV) light once the alginate scaffold forms by ionic cross-linking with calcium. Other variants of hybrid hydrogels are open to experimentation with this eye model, including the inclusion of collagen, methyl acrylate, or glutaraldehyde as UV-cross-linkable materials. Separating the process of defining the eye model's shape using ionically crosslinked sodium alginate from the process of strengthening the model with PVA or another material that depends on photo-activated or mechanical crosslinking appears to be optimal for maintaining optimum control over the quality of the final product. Cross-linking the eye model for strength early in the construction process may "lock-in" an undesired form or surface texture. Additional variations of the strengthening process include over-coating the alginate scaffold, or alternating between thin layers of the alginate scaffold with other interpenetrating scaffold types. Future reports on the eye model will include descriptions of variants utilizing hybridized hydrogels.

Example 11. Pressurization of the Eye Model

The eye model in storage relies on the inner core to maintain structural support of the shell. When tested by tonometry in this configuration (Tono-Pen XL, Reichert, Inc., Depew, NY), the model gave an ostensible IOP of approximately 15 mmHg, which closely resembles the normal physiological IOP of the living human eye. While the basic gelatin-filled eye model may be adequate for a specific purpose, in most applications a completely liquid or semi-gelatinous internal configuration is needed such that the IOP can be precisely adjusted via a manometer system (i.e., cannulation of the eye).

Preparing the model for cannulation begins with the creation of the main port. Care should be taken to not allow the surface of the eye model to dry out during the port connection process by wrapping the exposed eye model in wet gauze and rewetting as needed. The exposed distal tip of the simulated optic nerve sheath was excised with straight surgical scissors, thereby reserving a length of the sheath that remains attached to the globe, and which was sufficiently long enough to pass entirely into the cranium when the globe of the eye model was placed within the orbital eye mount at an anatomically correct position. A short length of the inner core gelatin (~5 mm) was then squeezed out of the end of the sheath with the fingertips and removed. The barbed end of a ⅛-inch luer-lock connector attached to tubing from the manometer system was then inserted into the open lumen of the optic nerve sheath (see FIG. 12). This port connector was customized such that it and the connected tubing could pass freely through the optic canal of the orbit coming from the cranium section of the headform. Fluid from the manometer system was flowing under a low positive pressure such that no air was introduced into the lumen while the barbed connector was inserted. If air bubbles consistently occur when connecting the port, immerse the eye model and the end of the barbed connector in a bath of the manometer system fluid such that no air is trapped when the barbed end is inserted. Additionally, it is possible to allow air to escape the manometry line but allowing the air bubble to float up to the top of the fluid reservoir where it can be removed easily.

After insertion of the port, the sheath was tied off to maintain a reliable, leak-free connection to the manometer system. Using a 15-in. length of flat, waxed dental floss, the outside of the sheath was wrapped three times immediately behind the barb, with the ribbon floss laid flat against the sheath surface. The slack was then taken up, and the free ends tied with double square knots and the ends trimmed close to the knot. The pressure in the manometer was raised slightly to confirm that the port connection did not leak. If leaking, the knot was cut off and the process repeated. Maintaining a longer sheath length allows the user to completely cut off the distal end of the sheath and start over in case the hydro gel has been cheese-wired by the floss.

The entire eye model was then immersed in warm water (~130° F.; ~54° C.) for several minutes or until the gelatin inner core was liquefied. The contents of the eye model were then replaced either by a cyclical process of suction and backfilling through the manometer line until the gelatin was dilutes and completely removed as indicated by the lack of dye color, or more quickly evacuated by the use of a co-linear input tube introduced via the leak-free catheter attachment to the manometer. This co-linear tube was a narrow gauge internal fill tube (~1 mm in diameter) located within the larger manometer tubing and extending to the end of the barbed portion of the main port. The fill fluid was then injected through the inner tube and evacuated simultaneously via the external tube. The use of a customized, sealed multi-port catheter arrangement of the manometer system allowed not only the precise placement of the internal fill tube, but also the introduction of internal instruments into the eye model, such as individual fiber-optic cables.

Example 12. Mounting the Eye Model

It should be noted that in typical use, the primary manometer tubing must pass through the optic canal opening of the bony orbit before potting the eye model. The current prototype of the eye holder made from silicone materials allowed the eye model to be loaded entirely from the back so it did not interfere with the porting of the eye model (see FIG. 13). A potential space exists within the eye holder to allow limited movement of the globe and simulated nerve with in the space. The potential space behind the globe was filled with petroleum jelly to simulate the density of orbital fat. Failure to fill this space would leave a pocket of air behind the eye, which would interfere with the propagation of a shock wave and provide unreliable results with the model. Before mounting the eye, the preferred angular orientation of the optic nerve as it exits the globe was determined, and the globe rotated about its geometric axis in order to orient the nerve toward the optic canal prior to tying off the port adapter. Orienting the nerve in this manner was helpful because the inherent stiffness of the manometer tubing tended to limit the ability to correct for a misalignment once the eye model was mounted into the orbit of the headform.

Prior to placing the eye holder into the orbit, it was helpful to rotate the headform so that the orbital openings were facing upwards, which allowed gravity to help position the eye holder fully into the orbit as the manometer tubing was retracted into the cranium portion of the headform. When mounted correctly, the end of the simulated optic nerve should pass easily into the optic canal, and the main port connection should be clearly visible near the optic chiasm inside the cranium indicating the optic nerve is fully extended within the orbit (see FIG. 14). A means of supporting and stabilizing the manometer tubing inside the cranium of the headform was deemed necessary to prevent the weight of the manometer line from tearing out the port or pinching the optic nerve sheath closed, which would restrict pressurization of the globe.

Figure 18:
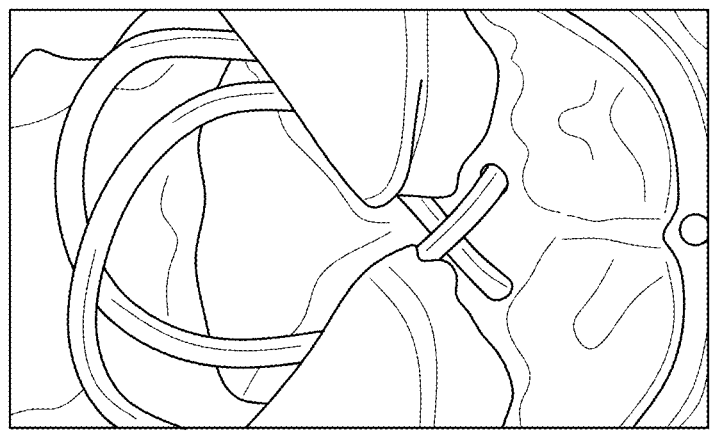
FIG. 18 is a photograph illustrating a view of overlapping ported ends of the optic nerves for mounting two eye models.

If the opposite orbit of the headform was also being used, the second eye model was mounted using the same process described above. When the eye holder for the second eye was positioned, the two fluid-filled sheaths overlapped one another in the area of the optic chiasm. Therefore, it was found helpful to have one of the optic nerve sheaths left longer such that the barbed ports did not directly overlie one another in the area of the chiasm, but rather the two ports were offset slightly (see FIG. 18). After mounting, the ends of the exposed sheaths were covered with moist gauze to prevent drying.

The final checklist included the following: checking for manometry leaks, checking that the cornea of the eye model is oriented in the intended direction (see FIG. 15), applying a thin layer of mineral oil to the anterior segment of the model to prevent drying, checking the level of IOP applied to the eye model, checking that flow in the manometry lines was not restricted, and checking the final position of any internal instrumentation. Internal instrumentation position was verified either by gauging the cable length passing into the catheter, or by visually confirming the location of the tip of the cable by looking into the globe as it was back-illuminated. However, direct visualization of internal instruments may not be possible depending on whether there is a loss of transparency when scaffold hybridization is used. Therefore, the use of an external imaging system that can locate objects inside the orbit, such as an ultrasound device, may be helpful.

Example 13. Eye Model Storage

Typically, the eye model was used the following day after production. When prepared carefully under sterile laboratory conditions, the eye model has been amenable to storage for at least two weeks under refrigeration in sealed jars. Typically, any dye used to visualize the inner core will diffuse out during storage and into the surrounding storage media. Long-term storage methods remain under consideration, but would likely include the use antifungal preservatives and preparation of the model under strict clean-room laboratory conditions. Ultraviolet (UV) radiation used to cross link a hybridized form of the scaffold, has an added benefit of being germicidal. Methods of preservation similar to those used for storing commercial hydrogel contact lenses would be acceptable.

Example 14. Scaffold Design

Figure 19:
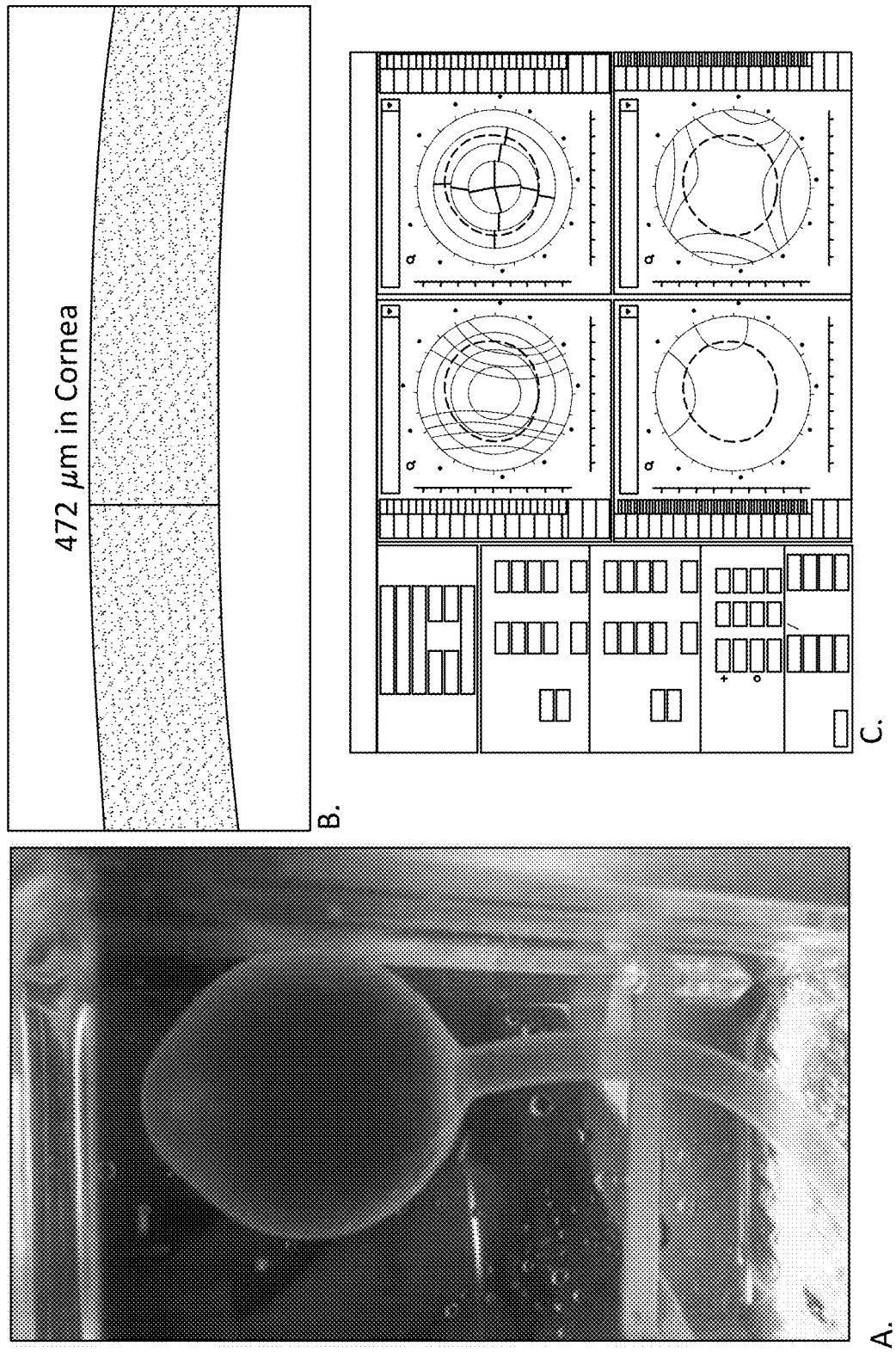
FIG. 19A-C illustrate the surrogate human eye model.

The novelty of the prototype eye model scaffold construction process is that a completely enclosed corneoscleral shell is produced in a single event when a precisely shaped inner core composed of solidified porcine gelatin infused with calcium chloride is immersed into a sodium alginate solution. The presence of calcium ions expressed from the gelatin initiates the crosslinking of the alginate, thereby creating the hydrogel shell (see FIG. 19A). The hydrogel shell effectively disappears in water due to the index of refraction of the shell being essentially identical to the water in which it is immersed. To aid in production and use of the eye model, the inner core was dyed with food coloring to allow it to be more easily seen. The thickness of the ionically-crosslinked hydrogel shell is determined largely by the deposition rate of the alginate. Therefore, controlling the time of exposure of the inner core to the liquid alginate solution determines the desired thickness of the corneoscleral shell, which can be confirmed subsequently by optical coherence tomography (OCT) measurements (see FIG. 19B) or by Scheimpflug-based tomography (see FIG. 19C).

Example 15. Alginate Concentration

Experimental testing was performed to determine an acceptable concentration level of the sodium alginate immersion solution for a fixed calcium chloride concentration of the inner core in order to produce the eye model. Through trial and error, a 1% solution of 20 g of sodium alginate to 2,000 mL of distilled water was determined to produce controllable shells of consistent scaffold thickness with smooth, optical-quality surfaces. Immersion solutions with more highly concentrated sodium alginate solutions (>3%) produced shells that tended to have irregular thickness and of overall lower quality due to roughly textured outer surfaces. Conversely, shells made with lower concentrations of alginate (~0.5%) formed scaffolds that tended to be consistently thin and fragile such that the scaffold easily broke apart with normal handing, and had low bursting strengths when the eye model was pressurized.

Other factors that affected shell quality included the speed of the orbital shaker and the volume of the alginate immersion bath. If the inner core was not immersed to a sufficient depth and lacked sufficient movement of the alginate solution, the thickness of the shell lacked uniformity, typically with one side of the globe being appreciably thinner than the rest. The alginate bath temperature was fixed by the room temperature at 70.0° F. (21.1° C.), which produced consistent results; however, during a brief period when the air conditioning in the laboratory varied by several degrees, the shell thickness became less predictable. Ideally, a temperature-regulated water bath should be used in maintaining the temperature of the solutions.

Example 16. Calcium Concentration

Standardizing on a 1% liquid alginate immersion solution, refinement of the alginate deposition rate over time was determined for 3 different calcium ion concentrations of the inner core (see FIG. 7). Through experimentation, a 2% solution composed of 3 g of calcium chloride to 150 mL of distilled water produced alginate scaffolds with good shell quality and a predictable thickness that could be controlled by the length of exposure time to the liquid alginate solution. Both optical coherence tomography (OCT) and Scheimpflug imaging tomography methods were used to verify the shell thickness.

Experiments with a Type B bovine gelatin for inner core production were found to be unsuitable. Inner cores made with Type B gelatin remained soft and fractured easily during the demolding stage. Altering the gelatin concentration was not helpful toward increasing the strength of the inner cores. In particular, the failure rate for the Type B gelatin approached 100% with the most common failure being fractures of the simulated optic nerve. In comparison, the Type A porcine gelatin had a nerve retention rate of 100% with an experienced user.

While other factors such as pH, temperature, and the stirring rate during alginate immersion should be controlled, the concentration of calcium was a critical determinant of a predictable shell thickness and repeatability. Inner cores made with a higher concentration of calcium (>3%) produced thicker shells more rapidly, but the accuracy of producing a specific shell thickness was degraded because of the inability to immediately stop the crosslinking process after a specific elapsed time in the alginate solution. While, the use of low calcium concentrations of around 0.5% produced hydrogel shells with good thickness predictability, they required significantly longer immersion times in the alginate to achieve the desired thickness. Longer times in the alginate tended to produce more quality control errors, such as a greater likelihood that the distal end of the optic nerve sheath would attach itself to the globe.

Example 17. Thickness Accuracy and Repeatability

Using all six of the eye mold positions, four separate attempts (N=24) were made to create eye models with a 1,000-μm central corneal thickness (CCT) at the corneal apex. The mean (±SD) CCT result measured by a single operator with a Pentacam® HR tomography system was 948.84±29.55 μm. In normal living human corneas, the reported variance of CCT measured by the Pentacam® HR has been on the order of ±30.71 μm in the human. Since each of the mold positions was formed from a unique master mold intended to create corneal curvatures between 38 and 44 diopters, the resulting CCT accuracy is acceptable for early development of the prototype. The SD value suggests that variance is acceptably low, and the method is repeatable and in agreement with biological variability in living human eyes.

Example 18. Curvature and Shell Thickness Effects and Artifacts

Figure 20:
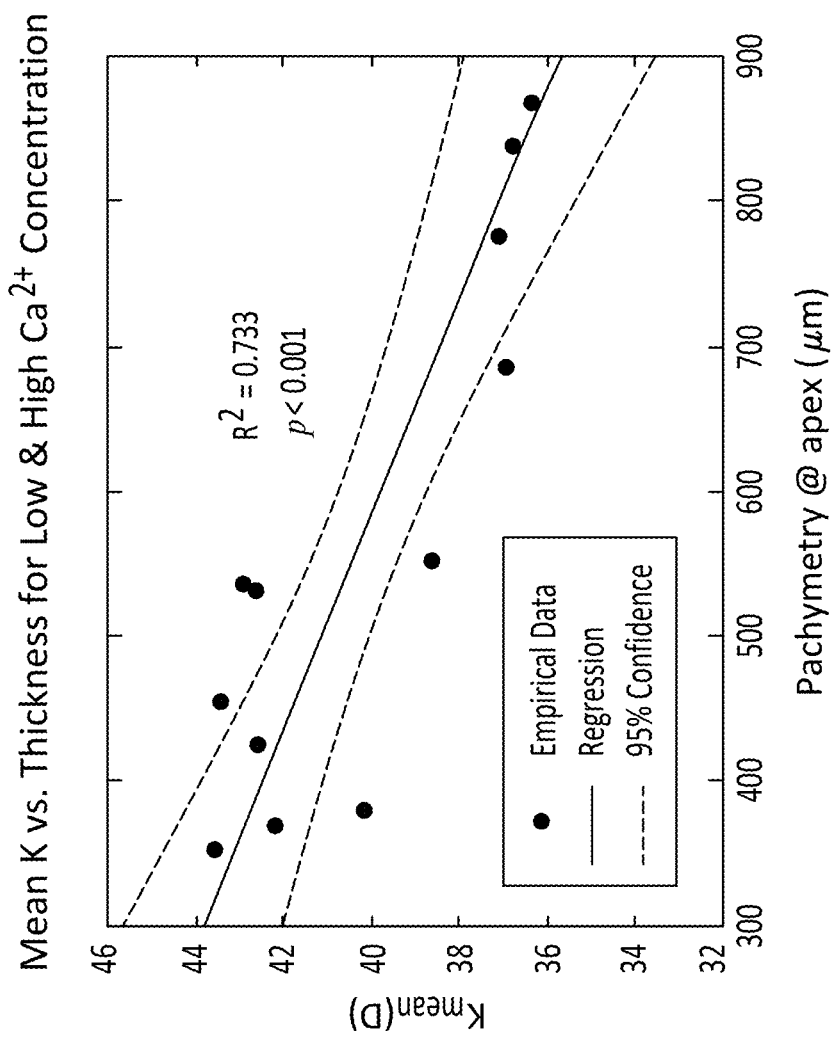
FIG. 20 is a graph illustrating change in corneal curvature with alginate exposure.

Producing shells of relatively greater thickness should theoretically affect the overall curvature of the surface. Curvature is inversely proportional to its radius of curvature, so increasing the shell thickness effectively increases the radius of curvature, resulting in the surface becoming relatively flatter. There is a statistically significant ($p<0.001$) and moderately strong ($R^2=0.781$) linear relationship between the mean keratometry curvature of the modeled corneal surface and the time of exposure to alginate, confirming that this effect does take place (see FIG. 20). This should be taken into account when designing eye models of a specific thickness and curvature.

Example 19. Producing Variable Thickness

Figure 21:
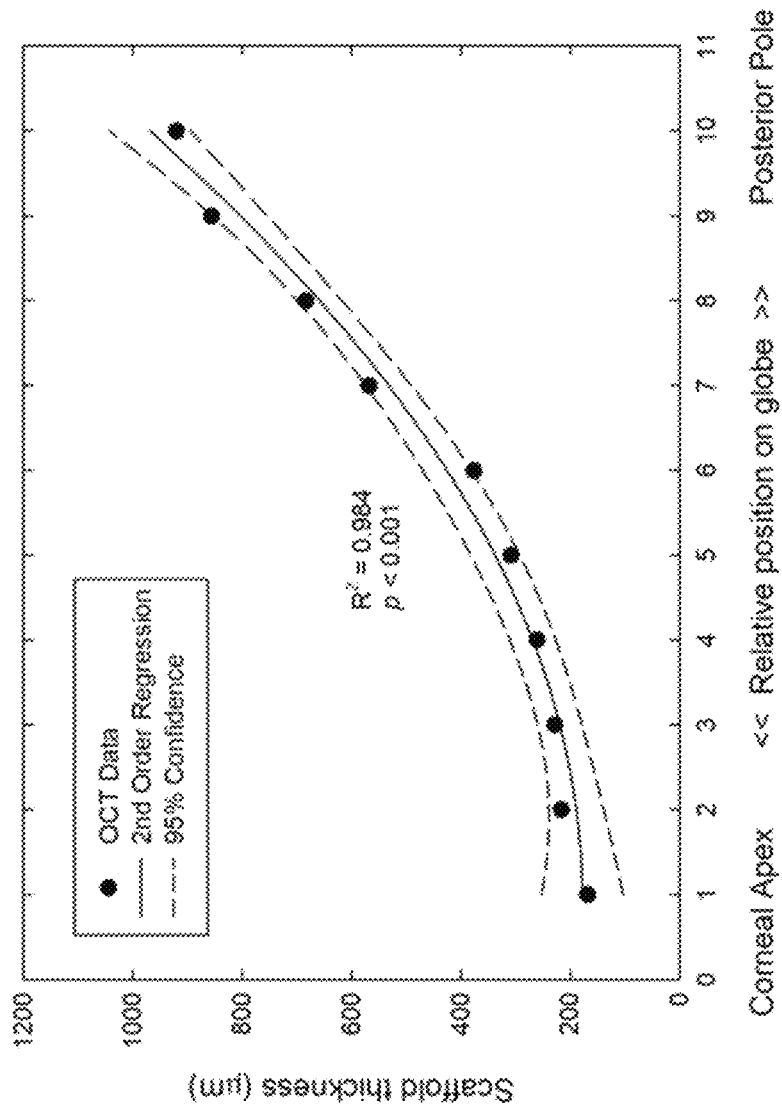
FIG. 21 is a graph illustrating control of corneal thickness by distance from the apex.

Additional experimentation into differentially controlling the exposure time to liquid alginate from the apex to the peripheral cornea by vertically mounting the inner core during immersion was shown to produce corneas with a thicker periphery and a relatively thinner apex (see FIG. 21). This creates a more accurate representation of true corneal thickness. This approach requires precise control of the liquid alginate delivery rate, making it more suitable for automated production methods. The application of the eye model will likely dictate whether such precise specifications are needed.

Example 20. Biomechanics

Results of the biomechanical characteristics of the completed eye model scaffolds was recorded using a clinical instrument that evaluated corneal hysteresis (CH) and corneal resistance factor (CRF). While this clinical device is designed and calibrated for use with living eyes, the results of such testing can be informative, particularly in that testing would illustrate that the eye model at this stage lacks structural resilience and stiffening such as that created by the presence of interwoven collagen fibers in the living eye. The IOP of the eye models were adjusted through cannulation to a nominal pressure of 15 to 18 mm Hg. Only distilled water was used as the intraocular medium. Shell thicknesses between 150 and 500 µm were tested simultaneously for CH and CRF using the Reichert Ocular Response Analyzer® (ORA) device. FIG. 10 illustrates the linear relation of CH as a function of thickness. The relationship was strong and statistically significant ($R^2=0.906$; $p<0.001$). CH was more than twice the value reported in living human eyes for a normal corneal thickness (~29 vs. 10.8), although the overall trend with thickness change was similar. This result was unexpected because the alginate scaffold alone was expected to be more pliable, which was thought to allow it to return to its original shape faster (i.e., show a more limited change in IOP between the stages of loading and unloading applanation by the air puff). Further investigations are needed to understand this result.

Figure 22:
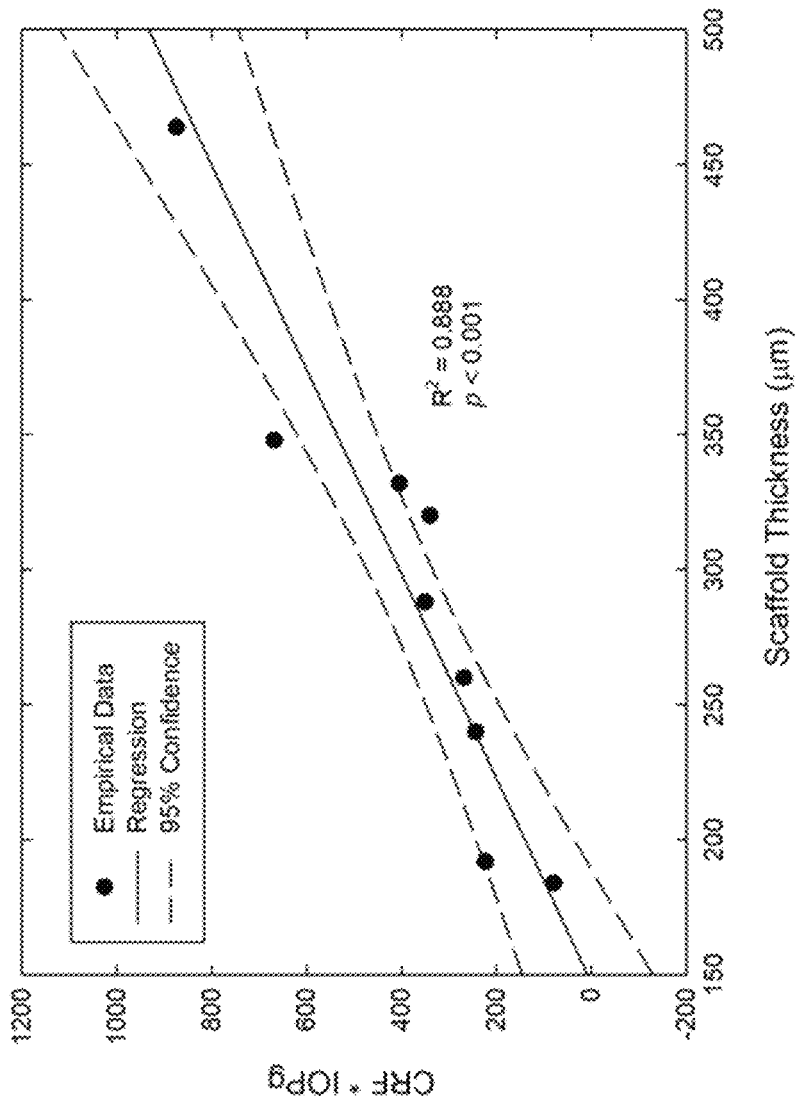
FIG. 22 is a graph illustrating corneal resistance factor (CRF) with IOP weighting.

FIG. 11 shows the linear relationship of the corneal resistance factor CRF for shell thickness from 150 to 500 µm. The CRF values were moderately strong and statistically significant ($R^2=0.645$; $p=0.009$). When weighted by IOP, the CRF values showed a stronger correlation that was also significant (FIG. 22; $R^2=0.888$; $p<0.001$). These data suggest that for a shell thickness equivalent to a normal human cornea, the CRF is approximately twice the amount found in the living human eye (~20 vs. 11.0), which is a result similar to that seen with CH.

Figure 23:
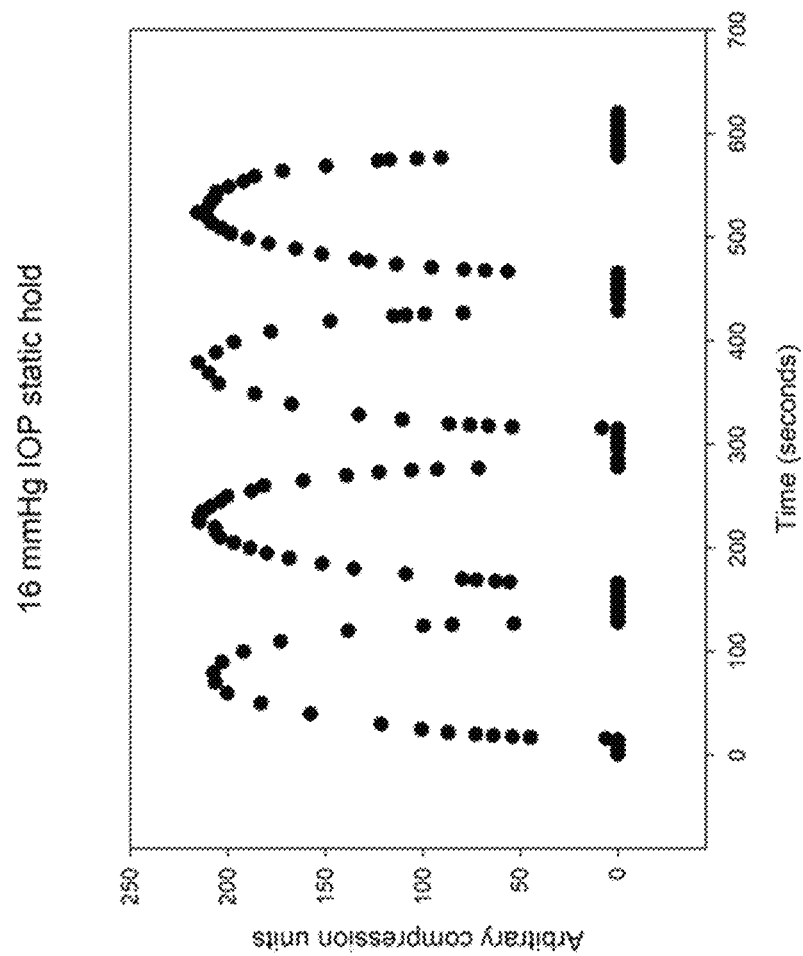
FIG. 23 is a graph illustrating constant IOP load testing with cyclical compression of the eye globe.
Figure 24:
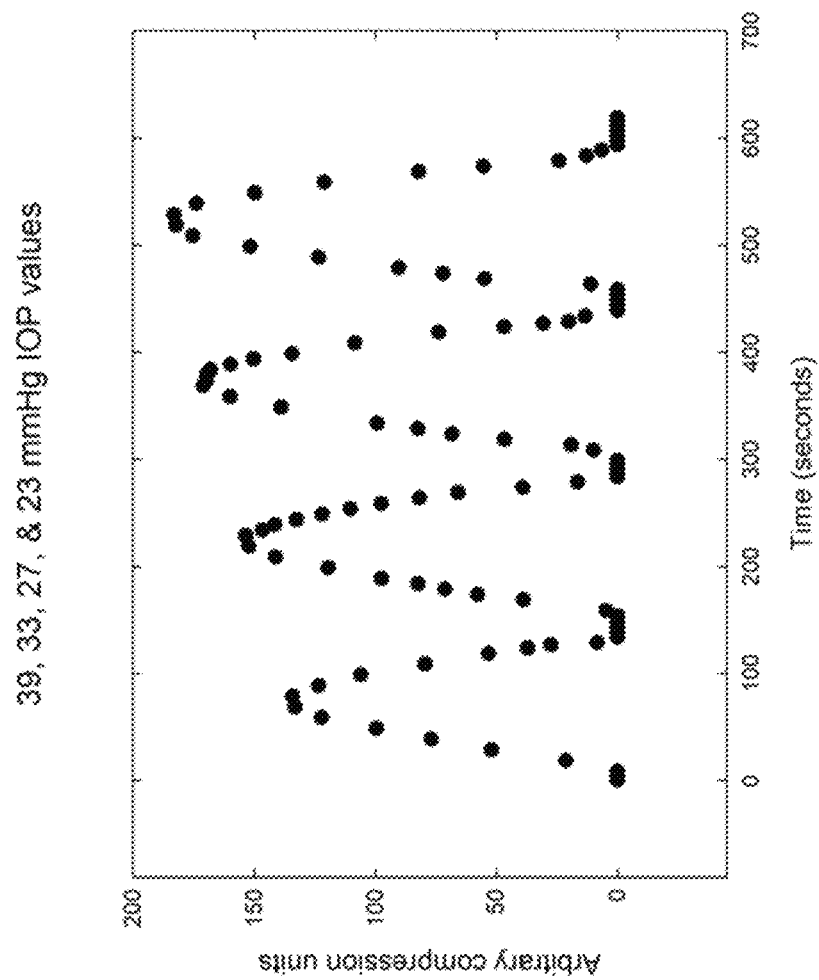
FIG. 24 is a graph illustrating ramped IOP Load with cyclical compression of the eye globe.

Additional preliminary work has been carried out in performing whole globe compression tests of the intact, pressurized eye models. In this study, back-illuminated globes of 1 mm shell thickness were compressed between glass plates using a microprocessor-controlled loading system. Loading and unloading for 4 cycles with a constant 16 mm Hg IOP is shown in FIG. 23, and suggests that the shells are not prone to leakage or strain damage under the given load conditions. The initial cycle appears to be indicative of slightly reduced strain compared to the following 3 cycles, which can be interpreted as an initial conditioning cycle. Similarly, load and unloading was performed with step-wise changes in IOP (39, 33, 27, and 23 mmHg) induced between cycles (FIG. 24). Results were consistent with performance expectations.

Example 21. Artificially Intelligent Risk Analysis Model for Estimating Primary Blast Vision Loss Background Based on evidence from animal research and clinical reports, it is now accepted that primary blast events have the potential to injure the eye and optic nerve, resulting in a measurable loss of vision. However, to our knowledge, there are no clinical standards for evaluating the risk for vision loss based on parameters such as blast magnitude or orientation with respect to the head. Current ballistic eyewear was never designed to protect against primary blast injury, nor do the manufacturers claim that ability for any of their products. Consequently, there are no industry standards for evaluating the risk of blast-related vision loss. Such standards could guide the development of protective eyewear designs or new materials that combine ballistic impact protection with blast pressure reduction. This study is an attempt at creating an artificially intelligent (AI) risk analysis model to estimate the risk of vision loss due to various primary-blast conditions when no eye protection is worn, or while wearing either military-approved goggles or spectacles. The risk scores of this model are then elaborated upon with a color-coded risk analysis chart that facilitates comparisons between eyewear types, and identifies the blast conditions where the risk for vision loss rises to unacceptable levels.

Methods

Data for training an artificial neural network (NN) model were acquired from a database of primary blast wave tests conducted by the United States Army Aeromedical Research Laboratory (USAARL). Overpressures at the corneal plane position were measured with PCB Piezotronics® pressure sensors within the right and left orbits of a headform. The peak incident pressure was measured at a location above and between the headform and the shock tube. A total of 51 blast events were used (N=16 with no protection; N=17 for goggles; and N=18 for spectacles). Peak corneal overpressure data were recorded at incident pressure magnitudes that varied between 11.37 and 44.47 psi (pounds per square inch) with a mean=24.66±12.27 sd. Positive phase duration varied from 2.966 to 5.318 ms (milliseconds) with a mean=4.20±0.92 sd. Between blasts, the headform was rotated about the vertical axis in ±45° increments to determine the effect of orientation on corneal overpressure. Negative orientation angles indicated blasts to the left side of the face and head, while positive angles indicated blasts to the right side with 0° indicating a blast perpendicular to the face. The left and right eye peak corneal overpressures at each orientation were plotted as a function of the peak incident pressure. The slopes of these relationships were then fitted by a first-order linear regression analysis passing through the origin, which permitted intermediate data to be interpolated for the purpose of training a neural network. The $R^2$ statistic of the linear fitting varied from 1.000 to 0.994 (mean=0.999±1.25$e^{-3}$), and the p-value significance of the linear relationships varied from <0.0001 to 0.0029.

Interpolated incident pressures and corresponding corneal overpressures for right and left eyes at each orientation were entered into a spreadsheet. The corneal overpressure data were converted into a theoretical numerical risk score for vision loss by associating the overpressure value for an unprotected cornea at a 30 psi incident pressure and a 0° orientation with an absolute risk score of vision loss of 100%. This risk conversion routine was then applied in a linear fashion to all overpressures in the database such that risk was 0% when the corneal overpressure was zero. Included within this database were columns to indicate whether goggles or spectacles were worn for the corresponding data within each row. An entry of 1 or 0 indicated that the specified eyewear was worn or not worn, respectively. If both eyewear entries had a value of 0, no eye protection was worn. A total of 393 records were generated with 354 used for NN training and 39 randomly selected for validating the trained network. A backpropagation NN training method was used, with three input variables (the incident blast pressure plus the two indicators for type of eyewear worn), and seven output variables (the risk scores for vision loss associated with each of the seven possible blast orientations between 135° and −135° in 45° steps). The training set records were randomized in order of presentation. One complete training run was the presentation of all 354 training records, after which the training error was computed and synaptic weighting adjustment applied.

Results

The NN model trained to an error tolerance of 2.5% after >1.6 million runs. The independent validation data set had a 97.8% overall accuracy in scoring the risk magnitude. Once the NN model was trained, three risk analysis charts for the conditions of no protection, goggle protection, and spectacle protection were populated with their respective risk scores at each of the seven blast orientations for standardized incident pressures of 5, 10, 15, 20, 25, and 30 psi. These charts were also color-coded for five theoretical risk levels: minimal (0 to 10% risk); moderate (10 to 25%); major (25 to 50%); severe (50 to 75%); and extreme (>75%). Risk analysis charts were produced only for the left eye; right eye charts would be mirror images of the left eye. The risk analysis chart for the condition of no protection showed a mountain of major, severe, and extreme risk of vision loss centered around the 0° and −45° orientations. Because the eyes are offset from the 0° midline of the head, the peak exposure for the left eye to a blast in the unprotected condition should come from this negative degree offset orientation. In comparison, the left eye risk analysis chart for the goggle protection tended to have uniformly minimal risk in any blast orientation below 15 psi, and moderate risk above 15 psi. An isolated peak of major risk was indicated at 0° above 25 psi. Finally, the left eye risk analysis chart for the spectacles was asymmetrical with a peak for major risk above 15 psi centered on the −45° orientation, as well as an isolated peak for severe risk above 30 psi in the same blast direction. The major differences in risk between the goggles and spectacles is likely due to blast energy entering behind the open frame of the spectacles and/or reflecting off the nose.

CONCLUSION

The risk analysis charts indicated that goggles have a lower risk for vision loss from primary blast than spectacles, and that both forms of eye protection are superior to no protection at all. Validation with the independent data set confirms that our preliminary NN model is precise, accurate, and repeatable for evaluating the risk for vision loss during blast events with different magnitudes, orientations, and types of eye protection. However, this preliminary risk model is simplistic because 1) it is only based on the peak overpressure at the cornea, but not the exposure time; 2) it assumes that risk varies linearly with respect to overpressure; 3) it does not take into account the type or location of vision loss (e.g., optical vs. sensory loss); and 4) it does not factor in the ability to recover lost vision over time. While the risk score may need adjustment to assure that it is clinically meaningful and truly correlated to metrics of visual performance, the approach used in this preliminary risk analysis method may be helpful for guiding improvements in future theoretical risk analysis models as well as the design of future protective eyewear. The next step toward improving the NN-based risk analysis model will be to incorporate blast overpressure and corresponding cell necrosis data taken directly from locations inside the eye and optic nerve with the synthetic eye model, thus helping us to fulfill our goal of applying novel technological and scientific solutions to minimize the risk of vision loss in our Warfighters.

While specific aspects of the subject disclosure have been discussed, the above specification is illustrative and not restrictive. Many variations of the disclosure will become apparent to those skilled in the art upon review of this specification and the claims below. The full scope of the disclosure should be determined by reference to the claims, along with their full scope of equivalents, and the specification, along with such variations.

What is claimed is:

1. A surrogate human eye model, comprising: (a) a gelatin core having a sclera, an anterior chamber, a posterior chamber, a cornea and an optic nerve that is attached to the gelatin core and (b) an outer shell structure wherein said surrogate human eye model is made from a silicone-based master mold and dimensioned for replacement of postmortem ocular tissue.

2. The surrogate human eye model of claim 1, further comprising: a hydrogel coating deposited onto the gelatin core.

3. The surrogate human eye model of claim 2, wherein the hydrogel coating is made from alginate.

4. The surrogate human eye model of claim 2, wherein the hydrogel coating can be further hybridized by addition of molecules that increase strength and resilience.

5. The surrogate human eye model of claim 4, wherein the molecules are selected from a group consisting of: collagen, long-chain polysaccharide molecules, and ultraviolet light sensitive crosslinking molecules and activators.

6. The surrogate human eye model of claim 1, further comprising: a pressure sealable port at a distal end of the optic nerve.

7. The surrogate human eye model of claim 6, further comprising a slender, flexible tubing that is introduced through the sealable port.

8. The surrogate human eye model of claim 1, further comprising a crystalline lens.

9. The surrogate human eye model of claim 8, wherein the crystalline lens is constructed from gelatin and alginate-based hydrogel.

10. The surrogate human eye model of claim 1 made through a process comprising: (i) casting an internal shape of the surrogate human eye model as a gelatin core, and (ii) forming an exterior shape as an outer shell structure.

11. A surrogate human eye model system comprising: the surrogate human eye model of claim 1, an eye holder for retaining the surrogate human eye model, and a skull headform defining a bony orbit, said bony orbit for mounting and retaining the eye-holder.

12. The surrogate human eye model of claim 11, wherein the skull headform includes a model foramen at a back end of the bony orbit, wherein said model foramen is further connected to an optic chiasm defined within the skull headform, and an optic nerve of the surrogate eye model extends out of the eye holder, passes through the model foramen, and enters into the optic chiasm.

13. A method of modeling the effects of shockwaves, blunt impacts, and/or incisional impacts applied to an eye, the method comprising:
 supplying a surrogate human eye model comprising: (a) a gelatin core; (b) a sclera; (c) an anterior chamber; (d) a posterior chamber; (e) a cornea; (f) an optic nerve and (g) an outer shell structure, wherein the surrogate human eye model is made from a silicone-based master mold and dimensioned for replacement of post-mortem ocular tissue;
 embedding a recording instrumentation into the surrogate human eye model through the optic nerve;
 placing the surrogate human eye model into a skull headform;
 adjusting an intraocular pressure of the surrogate human eye model through a manometer line inserted into the optic nerve;
 applying a force to the surrogate human eye model in the form of blunt impacts, incisional impacts, and/or shock waves from explosive devices; and
 collecting data using said recording instrumentation before, during, and/or after the force was applied.

14. The method of claim 13, further comprising conducting the method with protective eyewear applied to the skull headform and conducting the method without protective eyewear applied to the skull headform.

15. A method of making a surrogate eye model comprising: (i) casting an internal shape of the surrogate eye model as a gelatin core, and (ii) forming an exterior shape as an outer shell structure.

16. The method of making the surrogate eye model of claim 15, wherein the method further comprises:
 liquifying the gelatin core within the outer shell structure by warming the gelatin core;
 cutting the distal end of the surrogate eye model to create a port;
 draining the gelatin core within the outer shell structure from the surrogate eye model through the port; and
 filling the surrogate eye model with a liquid until an internal pressure of the surrogate eye model matches a target pressure within a range of 8 to 44 millimeters of mercury.

* * * * *